US008940258B2

(12) United States Patent
Vera-Castaneda

(10) Patent No.: US 8,940,258 B2
(45) Date of Patent: Jan. 27, 2015

(54) REGENERATIVE RECOVERY OF CONTAMINANTS FROM EFFLUENT GASES

(71) Applicant: MECS, Inc., Chesterfield, MO (US)

(72) Inventor: Ernesto Vera-Castaneda, Chesterfield, MO (US)

(73) Assignee: MECS, Inc., Chesterfield, MO (US)

( * ) Notice: Subject to any disclaimer, the term of this patent is extended or adjusted under 35 U.S.C. 154(b) by 0 days.

(21) Appl. No.: 13/875,811

(22) Filed: May 2, 2013

(65) Prior Publication Data

US 2013/0315807 A1 Nov. 28, 2013

Related U.S. Application Data

(60) Provisional application No. 61/641,833, filed on May 2, 2012.

(51) Int. Cl.
*B01D 53/34* (2006.01)
*B01D 53/38* (2006.01)
(Continued)

(52) U.S. Cl.
CPC .............. *B01D 53/507* (2013.01); *B01D 53/40* (2013.01); *B01D 53/1425* (2013.01); *B01D 53/1481* (2013.01); *B01D 2257/2045* (2013.01); *B01D 2257/304* (2013.01); *B01D 2257/406* (2013.01);
(Continued)

(58) Field of Classification Search
USPC ................... 423/210, 220, 235, 237, 243.01, 423/243.11, 243.12
See application file for complete search history.

(56) References Cited

U.S. PATENT DOCUMENTS 2,031,802 A 2/1936 Tryer
2,295,587 A 11/1939 Fleming et al.
(Continued)

FOREIGN PATENT DOCUMENTS

CN 101481095 A 7/2009
EP 0500320 A1 8/1992
(Continued)

OTHER PUBLICATIONS

Becker, H., "Concepts of Flue Gas Desulfurization by the Linde-Solinox Process", 1987, Chem-Ing-Tech, 4, S, 346-347, with machine translation, 4 pages.
(Continued)

*Primary Examiner* — Timothy Vanoy
(74) *Attorney, Agent, or Firm* — Senniger Powers LLP

(57) ABSTRACT

This invention relates to processes for the selective removal of contaminants from effluent gases. More particularly, various embodiments of the present invention relate to selective removal and recovery of sulfur dioxide from effluent gases in a regenerative sulfur dioxide absorption/desorption process that achieves favorable energy efficiency. Energy is recovered from a wet stripper overhead gas stream produced in the desorption cycle by indirect transfer of heat from the stripper gas to a cooling medium and used to generate steam for use in stripping contaminants from the absorption liquor. The absorption zone may optionally be cooled to enhance the capacity of the absorption medium for absorption of a contaminant gas, thereby lowering the volume of absorption medium and contaminant-enriched absorption liquor that must be pumped, handled, heated and cooled in the absorption/desorption cycle.

48 Claims, 7 Drawing Sheets

(51) Int. Cl.
*B01D 53/50* (2006.01)
*B01D 53/40* (2006.01)
*B01D 53/14* (2006.01)

(52) U.S. Cl.
CPC ....... *B01D 2257/504* (2013.01); *B01D 2259/65* (2013.01)
USPC .......... 423/210; 423/220; 423/235; 423/237; 423/243.01; 423/243.11; 423/243.12

(56) References Cited

U.S. PATENT DOCUMENTS

| | | | |
|---|---|---|---|
| 2,368,595 A | | 8/1941 | Johnson |
| 2,399,013 A | | 9/1944 | Fleming et al. |
| 2,615,787 A | * | 10/1952 | Randlett ................ 423/223 |
| 2,729,543 A | | 1/1956 | Keller |
| 2,878,099 A | | 3/1959 | Breuing et al. |
| 3,687,624 A | * | 8/1972 | Terrana et al. ........... 423/243.09 |
| 3,757,488 A | | 9/1973 | Austin et al. |
| 3,833,508 A | | 9/1974 | Austin et al. |
| 3,886,069 A | | 5/1975 | Trondheim |
| 3,911,093 A | | 10/1975 | Sherif et al. |
| 3,991,161 A | | 11/1976 | Saitoh et al. |
| 3,992,508 A | | 11/1976 | Saitoh et al. |
| 4,079,118 A | | 3/1978 | Gorai |
| 4,083,944 A | | 4/1978 | Chalmers |
| 4,087,372 A | | 5/1978 | Saitoh et al. |
| 4,133,650 A | | 1/1979 | Germerdonk et al. |
| 4,181,506 A | | 1/1980 | Bengtsson |
| 4,222,993 A | | 9/1980 | Holter et al. |
| 4,277,268 A | | 7/1981 | Spangler |
| 4,277,451 A | | 7/1981 | Wakabayashi et al. |
| 4,310,691 A | | 1/1982 | Bengtsson et al. |
| 4,366,134 A | | 12/1982 | Korosy |
| 4,444,571 A | | 4/1984 | Matson |
| 4,576,813 A | | 3/1986 | McAlister |
| 4,670,242 A | | 6/1987 | McAlister |
| 4,695,349 A | | 9/1987 | Becker |
| 4,948,572 A | | 8/1990 | Erga |
| 4,968,501 A | | 11/1990 | Mason |
| 4,996,038 A | | 2/1991 | McAlister |
| 5,130,112 A | | 7/1992 | McAlister |
| 5,538,707 A | | 7/1996 | McAlister |
| 5,785,888 A | | 7/1998 | Tsai et al. |
| 6,096,239 A | | 8/2000 | Fung et al. |
| 6,174,348 B1 | | 1/2001 | Ahmed et al. |
| 7,214,358 B2 | | 5/2007 | Ravary et al. |
| 2008/0307968 A1 | | 12/2008 | Kang et al. |
| 2009/0101012 A1 | | 4/2009 | Gal et al. |
| 2011/0061533 A1 | | 3/2011 | Black et al. |
| 2012/0107209 A1 | * | 5/2012 | Vera-Castaneda ......... 423/242.2 |

FOREIGN PATENT DOCUMENTS

| | | |
|---|---|---|
| EP | 1078676 A2 | 2/2001 |
| GB | 371888 A | 4/1932 |
| GB | 400998 A | 11/1933 |
| WO | 2012058558 A2 | 5/2012 |

OTHER PUBLICATIONS

International Search Report and Written Opinion issued in PCT/US2013/039293, Oct. 15, 2013, 17 pages.

* cited by examiner

REGENERATIVE RECOVERY OF CONTAMINANTS FROM EFFLUENT GASES

CROSS-REFERENCE TO RELATED APPLICATIONS

This application claims the benefit of U.S. Provisional Patent Application Ser. No. 61/641,833, filed May 2, 2012, the entire disclosure of which is incorporated herein by reference.

FIELD OF THE INVENTION

This invention relates to processes for the selective removal of contaminants from effluent gases. More particularly, various embodiments of the present invention relate to selective removal and recovery of sulfur dioxide from effluent gases in a regenerative sulfur dioxide absorption/desorption process that achieves favorable energy efficiency. The recovery schemes of the invention are applicable to the removal and recovery of other acid gases such as hydrogen sulfide, carbon dioxide, and hydrogen chloride, as well as other contaminant gases such as ammonia.

BACKGROUND OF THE INVENTION

Gaseous effluents containing contaminant gases are produced by a variety of operations. For example, sulfur dioxide is generated in various chemical and metallurgical operations, including sulfur-burning sulfuric acid processes, spent sulfuric acid plants, roasting or smelting of sulfidic metal ores and concentrates and the combustion of sulfur-containing carbon fuels (e.g., flue gases from coal-fired power plants). Carbon fuels play a significant role in the generation of electricity, providing energy for heating and fuels for transportation. Most carbon fuels contain sulfur that when burned turns into sulfur dioxide. The sulfur dioxide emitted contributes to a wide range of environmental and health problems. As the emerging economies expand, their demands for energy rapidly increase and as lower sulfur content carbon fuels are depleted, more and more oil and coal reserves having increasingly higher levels of sulfur will be utilized leading to increased sulfur dioxide emissions.

There are also increasing regulatory pressures to reduce sulfur dioxide emissions around the world. The most commonly used method to remove sulfur dioxide is through absorption or adsorption techniques. One common approach is to contact sulfur dioxide with an aqueous stream containing an inexpensive base. The sulfur dioxide dissolves in water forming sulfurous acid ($H_2SO_3$) that in turn reacts with the base to form a salt. Common bases are sodium hydroxide, sodium carbonate and lime (calcium hydroxide, $Ca(OH)_2$). The pH starts at about 9 and is lowered to about 6 after the reaction with sulfur dioxide. A one stage wet scrubbing system usually removes over 95% of the sulfur dioxide. Wet scrubbers and similarly dry scrubbers require capital investment, variable costs due to lime consumption and solids disposal, and consume energy, and utilities to operate such sulfur dioxide removal systems.

Instead of reacting with a base like lime, sulfur dioxide in effluent gases may be recovered to be sold as a refined sulfur dioxide product, used as part of the feed gas to a contact sulfuric acid plant and recovered as sulfuric acid and/or oleum to meet the growing global demand of the fertilizer industry or fed to a Claus plant for the preparation of elemental sulfur. In addition to addressing the environmental and health problems associated with sulfur dioxide emissions, this approach recovers the sulfur values from coal and other sulfur-containing carbon fuels. However, these gas streams frequently have relatively low sulfur dioxide concentration and high concentration of water vapor. Where sulfur dioxide concentration in the gas fed to a sulfuric acid plant is less than about 4 to 5 percent by volume, problems may arise with respect to both the water balance and the energy balance in the acid plant. More particularly, the material balance of a conventional sulfuric acid plant requires that the $H_2O/SO_2$ molar ratio in the sulfur dioxide-containing gas stream fed to the plant be no higher than the $H_2O/SO_3$ molar ratio in the product acid. If the desired product acid concentration is 98.5 percent or above, this ratio cannot be more than about 1.08 in the sulfur dioxide-containing gas stream fed to the plant. As generated, effluent gases from metallurgical processes and flue gases from the combustion of sulfurous carbon fuels often have a water vapor content well above the 1.08 ratio, which cannot be sufficiently reduced by cooling the gas without significant capital and energy expenditures. Moreover, if the sulfur dioxide gas strength of the source gas is below about 4 to 5 percent by volume, it may not be sufficient for autothermal operation of the catalytic converter. That is, the heat of conversion of sulfur dioxide to sulfur trioxide may not be great enough to heat the incoming gases to catalyst operating temperature and, as a consequence, heat from some external source must be supplied. This in turn also increases both operating costs and capital requirements for the sulfuric acid facility.

Sulfur dioxide strength of gaseous effluents may be enhanced by selectively absorbing the sulfur dioxide in a suitable solvent and subsequently stripping the absorbed sulfur dioxide to produce regenerated solvent and a gas enriched in sulfur dioxide content. A variety of aqueous solutions and organic solvents and solutions have been used in regenerative sulfur dioxide absorption/desorption processes. For example, aqueous solutions of alkali metals (e.g., sodium sulfite/bisulfite solution), amines (e.g., alkanolamines, tetrahydroxyethylalkylenediamines, etc.), amine salts and salts of various organic acids have been used as regenerable sulfur dioxide absorbents.

Inorganic aqueous buffer solutions are also effective in absorbing sulfur dioxide. Fung et al. (2000) provides data on the solubility of sulfur dioxide for a 1 Molar solution of phosphoric acid and sodium carbonate in a ratio of about 1.57 $Na/PO_4$ as a function of temperature. Data are for the virgin mixture and the mixture where 1,000 ppm of adipic acid is added to enhance sulfur dioxide solubility. Fung et al. also indicate that when taken to a boiling temperature, 95% and 65% of the sulfur dioxide is removed, respectively, for the virgin mixture and mixture containing adipic acid. Calculations on the pH of the solution show that the pH changes from 6 to about 3 once sulfur dioxide is absorbed. As with organic solvents, there is a slight reaction of sulfur dioxide with oxygen forming sulfur trioxide. Although this reaction is very limited and when $Na_2CO_3$ is used it is further inhibited by its reaction with the free radicals formed during oxidation, the sulfur trioxide that is formed leads to the formation of sodium sulfate, which if the sodium sulfate is removed by crystallization, it is removed as sodium sulfate decahydrate ($Na_2SO_4.10H_2O$), also known as Glauber's salt. This salt can be removed by taking a slipstream and cooling it to force the precipitation of the Glauber's salt that is easily crystallized and removed by a screen, filtration, centrifugation or other solid/liquid separation technique.

U.S. Pat. No. 4,133,650 (Gamerdonk et al.) discloses a regenerative process for recovering sulfur dioxide from exhaust gases using a regenerable, aqueous dicarboxylic acid (e.g., phthalic acid, maleic acid, malonic acid and glutaric acid and mixtures thereof) scrubbing solution buffered to a pH of from about 2.8 to 9. The recovered sulfur dioxide can be used in the production of sulfuric acid.

Similarly, U.S. Pat. No. 2,031,802 (Tyrer) suggests using salts of substantially non-volatile acids having a disassociation constant between $1\times10^{-2}$ and $1\times10^{-5}$ measured at a dilution of 40 liters per gram molecule and a temperature of 25° C. (e.g., lactic acid, glycolic acid, citric acid and ortho-phosphoric acid) in a regenerative process for the recovery of sulfur dioxide from effluent gases.

U.S. Pat. No. 4,366,134 (Korosy) discloses a regenerative flue gas desulfurization process that utilizes an aqueous solution of potassium citrate buffered to a pH of from about 3 to about 9.

Organic solvents used in sulfur dioxide absorption/desorption processes include dimethyl aniline, tetraethylene glycol dimethyl ether and dibutyl butyl phosphonate. Like most solvents, the capacity of organic solvents is enhanced by higher pressures and lower temperatures. The sulfur dioxide gas is then recovered (and the solvent regenerated) by lowering the pressure and/or increasing the temperature. These organic solvents require the use of metallic construction and often require solvent regeneration due to the formation of sulfuric acid and in some cases due to the reaction of the solvent with sulfur trioxide formed by side reaction of sulfur dioxide with oxygen during the absorption/desorption process. Organic solvents are usually more expensive than the aqueous absorption solutions.

The significantly large flue gas flow rates emitted from a coal-fired power generation plant, lead to very large equipment size to recover the sulfur dioxide. Organic solvents that require metallic construction generally do not compete well economically with the wet scrubbers that commonly use fiber reinforced plastic (FRP) construction, coated vessels or low cost alloys.

Conventional organic solvents are also hampered by one or more shortcomings with regard to the characteristics desirable in an absorbent used in a sulfur dioxide absorption/desorption cycle. Many of these solvents have relatively low sulfur dioxide absorption capacity, especially at the sulfur dioxide partial pressures typically encountered in weak sulfur dioxide-containing effluents (e.g., from about 0.1 to about 5 kPa). These solvents often absorb substantial quantities of water vapor from the sulfur dioxide-containing effluent resulting in a significant reduction in the sulfur dioxide absorption capacity of the solvent. As a result, the molar flow rates of these solvents needed to satisfy the desired sulfur dioxide absorption efficiency is increased. Furthermore, the absorption of large quantities of water vapor in the solvent may lead to excessive corrosion of process equipment used in the sulfur dioxide absorption/desorption process. Moreover, some of these organic solvents are susceptible to excessive degradation, such as hydrolysis, or other side reactions or decomposition when the solvent is exposed to high temperatures in acidic environments and/or suffer from high volatility, leading to large solvent losses.

Copending and co-assigned U.S. Ser. No. 13/283,671, filed Oct. 28, 2011, and published as US 2012/0107209 A1, describes a sulfur dioxide recovery process that utilizes a buffered aqueous absorption solution comprising certain weak inorganic or organic acids or salts thereof, preferably certain polyprotic carboxylic acids or salts thereof, to selectively absorb sulfur dioxide from the effluent gas. The absorbed sulfur dioxide is subsequently stripped to regenerate the absorption solution and produce a gas enriched in sulfur dioxide content. The sulfur dioxide-enriched gas may be used as part of the feed gas to a contact sulfuric acid plant or to a Claus plant for the preparation of elemental sulfur or can be used for the production of refined sulfur dioxide. The process described in US 2012/0107209 A1 is particularly useful in producing a sulfur dioxide-enriched gas from effluent gases relatively weak in sulfur dioxide content. The application also describes processes for simultaneous removal of sulfur dioxide and nitrogen oxides ($NO_x$) from effluent gases and recovery of sulfur dioxide. The process utilizes a buffered aqueous absorption solution further including a metal chelate to absorb sulfur dioxide and $NO_x$ from the gas and subsequently reducing the absorbed $NO_x$ to form nitrogen.

Although the process of US 2012/0107209 A1 operates at high energy efficiency, a need has remained for further economies in the use of energy in regenerative sulfur dioxide recovery processes.

SUMMARY OF THE INVENTION

The present invention is directed to novel processes comprising features that enhance energy efficiency in regenerative absorption/desorption cycles for the recovery of sulfur dioxide and other contaminants from gaseous effluents. In certain embodiments of the process, energy is recovered from a wet contaminant gas stream produced in the desorption cycle. In these and other embodiments, the absorption zone may optionally and advantageously be cooled to enhance the capacity of an aqueous absorption medium for absorption of a contaminant gas, thereby lowering the volume of aqueous absorption medium and contaminant-enriched absorption liquor that must be pumped, handled, heated and cooled in the absorption/desorption cycle.

A prominent application of the processes of the invention is in the recovery of sulfur dioxide from various chemical and metallurgical effluent gases, as mentioned above. However, the improvements described herein are also applicable to the recovery of other acid gases such as, e.g., $H_2S$, $CO_2$, $NO_x$, or HCl, and also to the recovery of other contaminant gases such as ammonia.

Briefly, therefore, the present invention is directed to a process for selectively removing and recovering a contaminant gas from a contaminant-containing source gas in which a feed gas stream comprising the source gas is contacted in a contaminant absorber with an aqueous absorption medium comprising a sorbent for contaminant gas, thereby absorbing contaminant gas from the feed gas stream into the absorption medium and producing an exhaust gas from which contaminant gas has been removed and a contaminant-enriched absorption liquor. The contaminant-enriched absorption liquor is contacted with stripping steam in an absorption liquor stripper to desorb contaminant from the contaminant-enriched absorption liquor and thereby produce a regenerated contaminant absorption medium and a primary stripper gas effluent comprising water vapor and contaminant gas. Regenerated absorption medium is withdrawn from a liquid outlet of the absorption liquor stripper and primary stripper gas effluent is withdrawn from a vapor outlet of the absorption liquor stripper. Water is condensed from the primary stripper gas effluent by indirect transfer of heat from the primary stripper gas effluent to a cooling medium in a primary stripper gas cooler/condenser to thereby produce a contaminant-bearing condensate. The contaminant-bearing condensate exiting the primary stripper gas cooler/condenser is contacted with steam in a condensate stripper to produce a stripped condensate and a condensate stripper gas effluent containing water vapor and contaminant gas. The cooling medium to which heat is transferred from the primary stripper gas effluent in the primary stripper gas cooler/condenser comprises at least a portion of the stripped condensate, thereby generating steam from the stripped condensate. The steam generated from the stripped condensate in the primary stripper gas cooler/condenser is introduced into the absorption liquor stripper as stripping steam for contact with contaminant-enriched absorption liquor to desorb contaminant therefrom.

In one embodiment of the present invention, the primary stripper gas effluent withdrawn from the absorption liquor stripper is compressed and water is condensed from the compressed primary stripper gas effluent by indirect transfer of heat from the compressed primary stripper gas effluent to the cooling medium comprising at least a portion of the stripped condensate in the primary stripper gas cooler/condenser, thereby generating steam from the stripped condensate at a pressure in excess of the pressure within the absorption liquor stripper at the liquid outlet thereof. The steam generated from the stripped condensate in the primary stripper gas cooler/condenser is then introduced into the absorption liquor stripper as stripping steam for contact with contaminant-enriched absorption liquor to desorb contaminant therefrom.

In accordance with another embodiment of the present invention, the steam generated from the stripped condensate in the primary stripper gas cooler/condenser is compressed at a pressure in excess of the pressure within the absorption liquor stripper at the liquid outlet thereof. The compressed steam is then introduced into the absorption liquor stripper as stripping steam for contact with contaminant-enriched absorption liquor to desorb contaminant therefrom.

In these and other embodiments, the absorption zone may be cooled to enhance the capacity of an aqueous absorption medium for absorption of a contaminant gas. In such embodiments, a portion of the contaminant gas-enriched absorption liquor is circulated between the absorber and a heat exchanger where heat of absorption is removed by transfer to a cooling fluid.

Other objects and features will be in part apparent and in part pointed out hereinafter.

BRIEF DESCRIPTION OF THE DRAWINGS

Corresponding reference numerals indicate corresponding components throughout the drawings.

DESCRIPTION OF THE PREFERRED EMBODIMENTS

Figure 1:
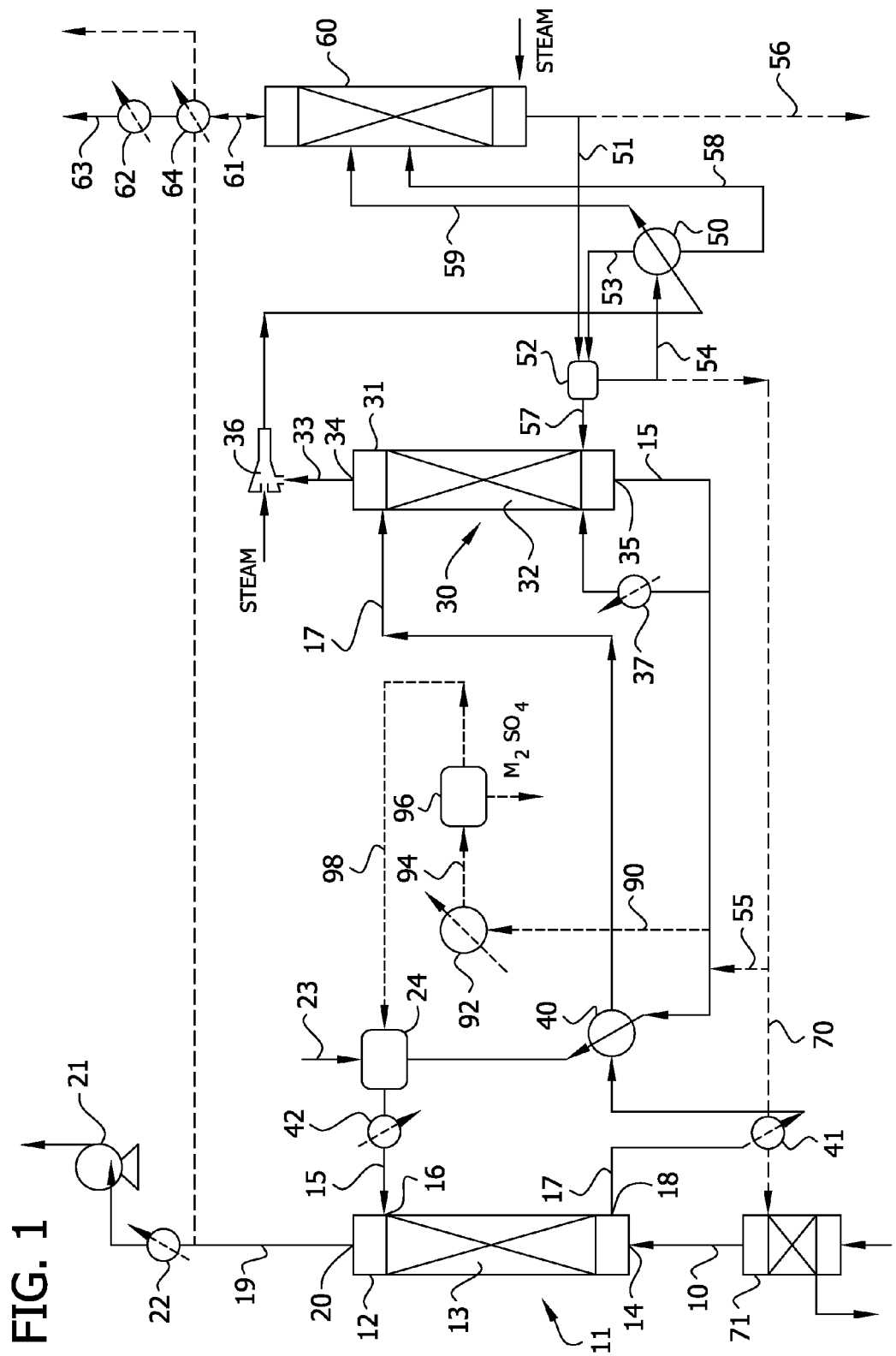
FIGS. 1 and 2 are alternative schematic flow sheets of absorption/desorption processes for selectively removing and recovering sulfur dioxide from a sulfur dioxide-containing source gas in which desorption of sulfur dioxide from the absorption liquor is achieved by contact with live steam in a stripping column, and the live steam is generated by indirect transfer of heat from the stripper overhead gas to a cooling medium comprising a boiling water stream in a stripper gas cooler/condenser.

In accordance with the invention, several novel process schemes have been developed for recovery of a contaminant gas from a source gas at relatively high energy efficiency. The processes of the invention are particularly applicable to the recovery of acid gases such as sulfur dioxide, oxides of nitrogen, hydrogen sulfide, carbon dioxide, and the like, but are also useful and valuable in the recovery of other contaminant gases such as, e.g., ammonia. The generic term "contaminant" is used herein because typically the processes of the invention are used in cleaning up effluent gas streams from chemical, metallurgical or power generation facilities in order to minimize emissions of acid gases or other gas components that would otherwise be contaminants in the atmosphere. However, as recognized by those skilled in the art, the contaminant gases that are removed from the gas effluent streams are often of economic value and are recovered by the processes of the invention and then applied to commercially valuable uses such as, e.g., conversion of sulfur dioxide to sulfur trioxide and sulfuric acid, recovery of elemental sulfur from sulfur dioxide and hydrogen sulfide, recovery of hydrochloric acid or aqueous ammonia for use in chemical processing, recovery and conversion of hydrogen chloride to elemental chlorine and hydrogen, etc.

The processes of the invention may be illustrated by the particular case of sulfur dioxide recovery. In the practice of the present invention, a variety of aqueous and organic solvents can be used as the sulfur dioxide absorption medium. For example, the absorption medium may comprise aqueous solutions of alkali metals (e.g., sodium sulfite/bisulfite solution), amines (e.g., alkanolamines, tetrahydroxyethylalkylenediamines, etc.), amine salts or salts of various organic acids. Alternatively, the sulfur dioxide absorption medium may comprise an organic solvent, including, for example, dimethyl aniline, tetraethylene glycol dimethyl ether or dibutyl butyl phosphonate. Some organic solvents require the use of metallic construction and often require solvent regeneration due to the formation of sulfuric acid and in some cases due to the reaction of the solvent with sulfur trioxide formed by the side reaction of sulfur dioxide with oxygen during the absorption/desorption process and usually are more expensive than the inorganic absorption media. The significantly large flue gas flow rates emitted from a coal-fired power generation plant, lead to very large equipment size to recover the sulfur dioxide. Conventional organic solvents may also be hampered by one or more shortcomings with regard to the characteristics desirable in sulfur dioxide absorption media as noted above.

In light of these and other considerations, in accordance with a preferred embodiment of the present invention, the sulfur dioxide absorption medium comprises a buffered aqueous solution of a salt of a relatively weak polyprotic carboxylic acid (e.g., sodium malate) as described in the aforementioned U.S. Ser. No. 13/283,671, filed Oct. 28, 2011, and published as US 2012/0107209 A1, the entire content of which is expressly incorporated herein by reference. In the following description, reference is made to the preferred absorption medium comprising a salt of a polyprotic carboxylic acid as well as to an absorption medium comprising tetraethylene glycol dimethyl ether (tetraglyme). However, it should be understood that the various features of the processes described herein are readily adapted to systems in which other absorption media are employed. As noted above, it should also be understood that the improvements described herein are likewise applicable to systems for the removal and recovery of other acid gases and contaminants using appropriate conventional contaminant absorption media known in the art. For example, the processes described herein can be used in the regenerative absorption and desorption of various contaminants from effluent gas streams, including hydrogen sulfide, carbon dioxide, and hydrogen chloride, nitrogen oxides, as well as other contaminant gases such as ammonia and mixtures thereof.

As shown in FIG. 1, the optionally conditioned process feed gas stream 10 comprising the sulfur dioxide-containing source gas is introduced into a sulfur dioxide absorber 11 having one or more theoretical stages where it is contacted with an aqueous absorption medium comprising a sorbent for sulfur dioxide to absorb the sulfur dioxide. Sulfur dioxide absorber 11 comprises a vertical column or tower 12 containing a gas/liquid contact zone 13 comprising means for promoting mass transfer between the gas and liquid phases that may comprise a bed of random packings such as saddles or rings, structured packing, or other contacting device. Preferably, in order to maximize transfer of sulfur dioxide, the process feed gas stream is contacted countercurrently with the aqueous absorption solution. As shown in FIG. 1, process feed gas stream 10 is introduced through a gas inlet 14 near the bottom of tower 12 and enters the bottom of gas/liquid contact zone 13, while a stream 15 comprising regenerated aqueous absorption medium recirculated from sulfur dioxide stripper 30 (described later herein) is introduced through a liquid inlet 16 near the top of the tower and is distributed over and enters the top of the gas/liquid contact zone. A sulfur dioxide-enriched absorption liquor stream 17 exiting the bottom of gas/liquid contact zone 13 is withdrawn from a liquid outlet 18 near the bottom of tower 12 and an exhaust gas stream 19 substantially free of sulfur dioxide exiting the top of zone 13 is withdrawn from a gas outlet 20 near the top of the tower. Although a conventional, randomly packed tower may be employed as absorber 11, those skilled in the art will appreciate that other configurations may be suitably employed. For example, absorber tower 12 may contain structured packing or comprise a tray tower, in either of which the process streams preferably flow countercurrently. Although countercurrent flow between the process feed gas stream 10 and the aqueous absorption medium in the absorber is preferred, the absorber may be operated co-currently. However, such an arrangement tends to negatively impact absorption capacity and efficiency and is generally less preferred.

Where an acid salt absorbent or other species that combines chemically with sulfur dioxide is present as the principal sorbent in the aqueous aborption medium, concentration of sorbent in the absorption medium and the rate of absorption medium flow should be such that, at the temperature prevailing at the liquid exit of the absorber, excess absorptive capacity remains in the absorption liquor. Preferably, the remaining capacity is at least 10%, preferably at least 20% of the total absorptive capacity entering the absorber. For this purpose, the sorbent concentration and absorption medium flow rate entering the absorber should be sufficient to provide stoichiometric excess in the rate of sorbent flowing through the absorber relative to the rate at which sulfur dioxide is to be recovered from the process feed gas stream, preferably in excess relative to the total sulfur dioxide content of the feed stream, thus to compensate for several factors such as: the sulfur dioxide content remaining in the absorption medium after the regeneration thereof; the concentration of sulfur dioxide in the sulfur dioxide-enriched stripper gas; the possible presence of slightly acidic components such as carbon dioxide; but mainly to compensate for desirably relatively weak absorptive affinity of preferred sorbents such as an aqueous polyprotic carboxylic acid/salt absorption system. A relatively weak absorptive affinity is preferred in order to facilitate the subsequent desorption of sulfur dioxide via a mild temperature increase and/or reduction of pressure. Accordingly, the concentration of sorbent in the aqueous absorption medium necessary to attain the desired removal efficiency varies with the acid employed, the concentration of sulfur dioxide in the gas to be treated as well as the mass transfer characteristics of the absorber and can be readily determined by one skilled in the art. Typically, the stoichiometric equivalents ratio of sulfur dioxide absorbed per mole of polyprotic carboxylic acid salt in the absorption solution ranges from about 0.1 to about 1. In the case of an aqueous absorption solution comprising the sodium salt of malic acid to treat a gas comprising about 2600 ppmv (parts per million by volume) sulfur dioxide, the concentration of malate in the absorption solution can suitably range from about 1 mole % to about 7 mole %.

The mass flow rate ratio (L/G) of aqueous absorption solution stream 15 and process feed gas stream 10 introduced into sulfur dioxide absorber 11 necessary to achieve substantial transfer of sulfur dioxide from the source gas to the absorption solution may be determined by conventional design practice. More particularly, the L/G can be selected based on the contaminant content of the gas stream entering the absorber, the concentration of sorbent in the aqueous absorption medium, and the unit absorptive capacity of the sorbent at liquid/gas temperature prevailing in the absorber. Typically, the L/G is selected such that the flow of sorbent into the absorber is in at least 10 to 20% excess over the flow of contaminant gas into the absorber. The optimal extent of excess depends on the rate of mass transfer and heat transfer in the gas/liquid contact zone.

Preferably, the sulfur dioxide absorber is designed and operated such that the sulfur dioxide content of exhaust gas stream 19 exiting the absorber is less than about 500 ppmv, more preferably less than about 200 ppmv (e.g., as low as 10-20 ppmv). This trace amount of sulfur dioxide along with carbon dioxide, oxygen, nitrogen and other inerts contained in the process feed gas stream are eliminated from the system as part of the exhaust gas stream 19 vented from the top of the absorber. The exhaust gas is in substantial equilibrium with the absorption solution, and depending on the water vapor content of the process feed gas stream fed to the absorber, and the absorber conditions, there may be a net gain or loss of water in the absorber. If necessary, a blower 21 is used to drive the gases to the stack. In order to achieve satisfactory emission standards, exhaust gas stream 19 may be passed through a mist eliminator or similar device for recovery of entrained liquid before being discharged through the stack. In addition or alternatively, in some cases exhaust gas stream 19 may be heated by indirect heat exchange in a heat exchanger 22 with the incoming flow of process feed gas or using other heating media or in heat exchanger 64 as described below so that any plume will not have the tendency to descend after being emitted through the stack.

As shown in FIG. 1, where the sorbent comprises a polyprotic carboxylic acid, a make-up source of metal base 23 such as sodium hydroxide, potassium hydroxide, sodium carbonate, etc., is combined with stream 15 comprising regenerated aqueous absorption medium in a solvent tank 24 before being introduced near the top of absorber tower 12. The metal base reacts with the polyprotic carboxylic acid to form the metal salt absorbent. In accordance with the disclosure in US 2012/0107209 A1, sufficient metal base is introduced to neutralize at least some of the acid groups such that the acid is neutralized to within about 20%, more preferably to within about 10%, of the equivalence point of the acid dissociation having a pKa value of from about 3 to about 10 at 25° C., preferably from about 4 to about 7 at 25° C. One skilled in the art can use known pH control techniques and instrumentation to add base to the regenerated absorption solution contacted with the sulfur dioxide-containing gas in the absorber to maintain the desired degree of neutralization with respect to the equivalence point of the pKa value. Furthermore, sufficient base should be added to maintain the metal ion concentration. For example, as described below, some of the metal ion is lost with the sulfate salt removed in a crystallizer operation. Two moles of the base (e.g., sodium hydroxide), are added per mole of sodium sulfate removed. The metal ion concentration can be suitably monitored and controlled by taking samples and running metal analysis in the plant laboratory.

The sulfur dioxide-enriched absorption liquor 17 exiting absorber 11 is heated to an intermediate temperature (as described below) and the preheated absorption liquor is introduced into sulfur dioxide stripper 30 wherein sulfur dioxide is dissociated from the sorbent and desorbed from the absorption liquor. Stripper 30 comprises a vertical column or tower 31 containing a vapor/liquid contact zone 32 comprising means for promoting mass transfer between the gas and liquid phases. Like absorber 11, stripper 30 can be configured in the form of a packed tower containing a bed of conventional random packing, structured packing, trays or any other gas-liquid contacting device. The lower (stripping) section of vapor/liquid contact zone 32 within tower 31 may be fed with live steam generated in accordance with the present invention (as described below) and used to remove the sulfur dioxide from the absorption liquor. The upper (refining) section of vapor/liquid contact zone 32 is used to reduce the amount of water in the desorbed sulfur dioxide. A primary sulfur dioxide-enriched stripper gas effluent 33, comprising sulfur dioxide substantially saturated with water vapor, is produced in the overhead of stripper 30 above vapor/liquid contact zone 32 and withdrawn from vapor outlet 34 at the top of tower 31; and regenerated absorption solution 15 exiting the vapor/liquid contact zone is withdrawn from a liquid outlet 35 at the bottom of the tower and recirculated back to absorber 11 completing the cycle. Although countercurrent flow between the sulfur dioxide-enriched absorption liquor and stripping steam in the stripper as shown in FIG. 1 is preferred, the stripper may be operated co-currently. However, such an arrangement tends to negatively impact stripping efficiency and is generally less preferred.

The average temperature of the sulfur dioxide absorption medium in absorber 11 is generally maintained in the range of from about 10° C. to about 70° C. In accordance with the present invention, the average temperature of the sulfur dioxide absorption liquor in the absorber is preferably maintained from about 20° C. to about 60° C. Although in general the absorption of sulfur dioxide is enhanced at lower absorption medium temperatures, the absorption liquor needs to be heated from the absorption temperature to a temperature sufficiently high and/or under reduced pressure to release the sulfur dioxide and providing this sensible heat leads to higher energy demands. During regeneration, it is also desirable to reduce the amount of water vaporized to lower the energy consumed and avoid low water concentrations in the absorption medium that may cause the precipitation of the sulfur dioxide sorbent (e.g., weak polycarboxylic acid or salts). The overall efficiency of the sulfur dioxide absorption/desorption process is improved when the absorption is relatively strongly dependent on temperature and within a narrower range of temperatures between the absorption and desorption stages of the cycle.

The average temperature of the sulfur dioxide absorption liquor in stripper 30 is generally maintained in the range of from about of 60° C. up to the boiling point of the absorption solution at the stripper operating pressure.

The absorption and desorption of sulfur dioxide may be enhanced by increasing or decreasing the operating pressures of absorber 11 and stripper 30, respectively. Suitable operating pressures in absorber 11 are from about 70 to about 200 kPa absolute. Increased pressure in the absorber increases the fraction of sulfur dioxide which the absorption medium can absorb, but the absorption is preferably carried out at relatively low pressure thereby reducing equipment costs. Similarly, suitable operating pressures in stripper 30 are from about 40 to about 200 kPa absolute, but higher or lower operating pressures may be employed.

Temperature control within absorber 11 and stripper 30 may be achieved by controlling the temperature of various process streams fed to these operations. Preferably, the temperature in stripper 30 is maintained within the desired range by controlling the temperature of the sulfur dioxide-enriched absorption liquor 17 and steam introduced near the bottom of the stripper in the stripping section of vapor/liquid contact zone 32. Again referring to FIG. 1, the sulfur dioxide-enriched absorption liquor 17 exiting absorber 11 at a temperature of from about 10° C. to about 70° C., more preferably from about 20° C. to about 60° C. is passed through a heat interchanger 40 where it is preheated to an intermediate temperature by indirect transfer of heat from regenerated absorption medium 15 being recirculated from stripper 30 to the sulfur dioxide absorber. Transfer of heat from the regenerated absorption medium to the absorption liquor within the interchanger increases the absorptive capacity of the regenerated absorption medium and heats the absorption liquor to help promote stripping of sulfur dioxide therefrom. If further heating is required in order to achieve the desired temperature in the stripper, sulfur dioxide-enriched liquor 17 may be passed through a solvent heater 41, where it is preheated (e.g., by indirect transfer of heat from a recovered sulfur dioxide product stream exiting the process), and/or further heated by indirect heat exchange with steam or with hot condensate stream 70. In certain advantageous embodiments, the sulfur dioxide-enriched absorption liquor is heated by transferring heat from process feed gas stream and/or regenerated sulfur dioxide absorption medium without the addition of extraneous heat. In such an embodiment, the temperature of the process feed gas stream is preferably not reduced to below about 50° C. and the difference in temperature between the sulfur dioxide-enriched absorption liquor introduced to the stripper and the regenerated absorption medium is less than about 40° C.

Regenerated aqueous absorption medium 15 exiting the bottom of stripper 30 at a temperature from about 60° C. to about 140° C. is cooled in interchanger 40 by transfer of heat to sulfur dioxide-enriched absorption liquor 17 exiting sulfur dioxide absorber 11. Similarly, if further cooling is required in order to maintain the desired temperature in the absorber, regenerated absorption medium leaving interchanger 40 may be passed through solvent cooler 42 and further cooled by indirect heat exchange with cooling tower water. Use of heat interchanger 40 reduces the energy demands of the system such that use of a solvent heater and/or solvent cooler may not be required.

In preferred embodiments of the present invention, sulfate salt contaminant levels in an aqueous absorption solution comprising a salt of a polyprotic carboxylic acid are maintained at an acceptable level by optionally diverting at least a purge fraction 90 of the regenerated absorption medium 15 exiting stripper 30 for treatment to remove sulfate. The relative volume of the purge fraction varies with the concentration of sorbent in the regenerated absorption medium and the susceptibility of the sulfur dioxide to oxidation in the course of absorption and stripping. Typically, in an operation using malate as an absorbent, the purge fraction may represent less than about 5% of the regenerated absorption medium stream.

Treatment of the purge fraction comprises evaporating water from purge fraction 90 in an evaporative crystallizer 92 to produce a concentrated solution supersaturated in the sulfate salt. Sulfate salt crystals are then precipitated from the concentrated aqueous absorption solution in the crystallizer to form a crystallization slurry 94 comprising precipitated sulfate salt crystals and a mother liquor. Sodium sulfate crystals are separated from the slurry in a conventional solid/liquid separation device 96 such as a vacuum filter or centrifuge and the mother liquor fraction 98 recirculated to solvent tank 24 where it is mixed with the main stream of regenerated absorption medium for return to absorber 11. Concentration of the aqueous absorption solution can be suitably achieved by heating and/or reducing the pressure, or increasing steam flow to the reboiler, to flash evaporate water. Typically, the aqueous absorption solution is heated to a temperature of at least about 40° C., more preferably at least about 60° C. and preferably to the boiling point of the absorption solution at the stripper operating pressure, during concentration to inhibit formation and precipitation of sodium sulfate decahydrate or Glauber's salt ($Na_2SO_4.10H_2O$). Glauber's salt tends to form a gelatinous or sticky precipitate that is not readily separated from the mother liquor by centrifugation or filtration.

The crystallizer may be operated at atmospheric pressure or under vacuum. As an alternative to separation of the sodium sulfate salt crystals by centrifugation or filtration, the crystallizer can be designed to continuously decant mother liquor from the crystallization slurry. Furthermore, the sulfate salt crystals may be washed with water and the resulting wash water comprising the polyprotic carboxylic acid salt absorbent likewise directed to the solvent tank for return to the absorber. The overhead vapor stream from the crystallizer may be condensed and returned to the absorber. Alternatively, the overhead stream from the crystallizer may be routed to the stripper as a source of stripping steam.

Although the treatment described above is effective for maintaining acceptable sulfate salt levels in the circulating absorption solution, in accordance with some embodiments of the present invention, an oxidation inhibitor can be included in the absorption solution to reduce oxidation of bisulfite and sulfite to bisulfate and sulfate contaminants, respectively. There are several different types of oxidation inhibitors that may be useful in the practice of the present invention, including: oxygen scavengers and free radical trappers such as p-phenylenediamine and hydroquinone; inhibitors of $NO_x$-catalyzed oxidation such as ascorbic acid; and chelating agents such as ethylenediaminetetraacetic acid (EDTA) which sequester and inhibit metal-catalyzed oxidation. Such oxidation inhibitors can be employed individually or in various combinations and can be added as needed to the regenerated aqueous absorption solution introduced to the absorber. Depending on the type of inhibitor(s) employed, the concentration in the absorption solution typically ranges from a few ppm to from about 1 to about 10 percent by weight. An excess is typically added (e.g., at least about 1000 ppm) since the inhibitors will gradually be consumed by oxidation. Ascorbic acid and hydroquinone are particularly effective in inhibiting oxidation in a sodium malate absorption solution. EDTA is expected to be effective as an oxidation inhibitor when metals are present in the absorption solution.

Increased acidity in the absorption solution has the effect of increasing sulfur dioxide stripping efficiency. Thus, leaving a small concentration of dissolved sulfur dioxide or maintaining some sulfate in the absorption solution leads to higher efficiency in the stripper. For example, a small concentration of sodium sulfate and/or sulfurous acid in the stripper makes the regeneration of the absorbing solution less energy intensive. In accordance with one embodiment of the invention, the concentration of sulfate salt is maintained at from about 0.5 to about 11 weight percent, preferably from about 3 to about 11 weight percent in the absorption solution and a small fraction of sulfur dioxide is left in the regenerated aqueous absorption solution thus making the solution slightly more acidic and consequently making the desorption of sulfur dioxide less energy intensive.

Generation of Stripping Steam from Stripped Condensate

To provide a source of energy for generating stripping steam, primary stripper gas effluent 33 from absorption liquor stripper 30 is compressed in an apparatus suitable for increasing the pressure of the primary stripper gas effluent. Suitable apparatus include mechanical compressors and thermal compressors (i.e., steam-jet ejectors). As shown in FIG. 1, the primary stripper gas effluent is preferably compressed by passage through a steam-jet ejector 36. Where sulfur dioxide is recovered from the tail gas of a contact sulfuric acid plant, steam generated in sulfur trioxide absorption heat recovery may provide the motive steam for the ejector.

Although absorption/desorption systems for recovery of sulfur dioxide are known in which the wet sulfur dioxide stripper gas is compressed and the latent heat of condensation of water vapor is transferred from the compressed gas to the sulfur dioxide-enriched absorption liquor, in such systems the condensate exits the system saturated with sulfur dioxide. Unless the sulfur dioxide emanating from the condensate is captured in a separate system, this scheme creates unacceptable emissions that also equate to loss of sulfur dioxide values.

In the process described in the aforementioned US 2012/0107209 A1, sulfur dioxide is recovered from the condensate in a condensate stripping column, but this entails additional energy consumption.

According to the process of the present invention, the energy required for stripping the condensate is substantially recovered by use of the stripped condensate as a source of stripping steam for the absorption liquor stripper. Further energy input is required to vaporize the condensate at a pressure sufficient for it to flow into the base of the stripper. In the process of the invention, the latent heat in the water vapor component of the stripper gas provides that source of energy. Modest compression of the stripper gas exiting the absorption liquor stripper creates the modest temperature differential sufficient for transfer of heat from the compressed stripper gas to the stripped condensate, thereby vaporizing the stripped condensate at a pressure sufficient to drive the resulting steam into the stripper.

Compression of the wet sulfur dioxide-containing gas effluent from the stripper preferably increases the pressure of the stream by an increment of from about 30 kPa to about 65 kPa. Separation of sulfur dioxide is enhanced if stripper 30 is operated at lower pressures (e.g., under vacuum) to increase the relative volatility of sulfur dioxide with respect to water and enhance desorption and decrease the number of theoretical stages needed for a given reflux. In addition, lower pressures lead to lower temperatures in the system allowing the use of lower pressure steam for heating the sulfur dioxide-enriched absorption liquor. However, recovery of energy is optimized at moderately higher operating pressures, and this also reduces the requisite diameter of tower 31 and associated capital cost. By way of example, operating the stripper under a slight vacuum (e.g., −35 kPa gauge) and modestly increasing the pressure of the sulfur dioxide-enriched stripper gas exiting the stripper (e.g., to about 20 kPa gauge) represents one economic approach. Nevertheless, operating the stripper at or above atmospheric pressure may also be an attractive approach. Economic optimization can determine the specific operating conditions. Balancing these considerations, the pressure of the primary stripper gas effluent exiting the absorption liquor stripper is most preferably maintained from about 40 to about 170 kPa absolute).

The pressurized flow of sulfur dioxide-containing stripper gas is directed to a primary stripper gas cooler/condenser 50. A substantial portion of the water vapor is condensed from the primary stripper gas effluent in cooler/condenser 50 by indirect transfer of heat to a cooling medium. In accordance with the present invention, stripped condensate in stream 51 flowing to cooler/condenser 50 from a condensate stripper or water column 60 (the operation of which is described hereinbelow) serves as the cooling medium and the latent heat of condensation is transferred to the stripped condensate thereby generating steam that is used as a stripping medium in absorption liquor stripper 30. As shown in FIG. 1, stripped condensate stream 51 exiting column 60 is directed to a vapor-liquid separator 52 (e.g., steam drum) and circulates via line 54 between the separator and cooler/condenser 50 where transfer of heat from the primary stripper gas generates steam 53 for the stripper. Stripped condensate and steam are separated in separator 52, the steam is directed to stripper 30 via line 57, at least a portion of the condensate circulates to primary stripper gas cooler/condenser 50 via line 54 and another portion may optionally be recirculated and combined with regenerated sulfur dioxide absorption solution 15 via line 55 and returned to absorber 11 and/or a portion 56 may be purged from the system. Alternatively, the condensate side of stripper gas cooler/condenser 50 may be designed to allow disengagement of steam from water within the heat exchanger itself, allowing a steam flow free of entrained water to flow directly from the cooler/condenser to the absorber, without the need for a separate vapor/liquid separator.

Steam generated in primary stripper gas cooler/condenser 50 is introduced to stripper 30 via line 57 where it contacts the absorption liquor in vapor/liquid contact zone 32, both supplying heat to the absorption liquor and functioning as a stripping gas for removing sulfur dioxide from the liquid phase. Heating of the liquid phase in the absorption liquid stripper reduces the equilibrium concentration of sulfur dioxide therein and enhances the driving force for transfer of sulfur dioxide to the vapor phase. In transferring heat to the liquid phase, steam generated from stripped condensate in cooler/condenser 50 partially condenses within the stripper, thus functioning essentially as a condensable stripping gas. Optionally, stripping heat supplied by steam generated from stripped condensate in the primary stripper gas cooler/condenser may be supplemented by heat supplied from an extraneous source in a reboiler 37 through which liquid phase from the absorption liquor stripper is circulated. The auxiliary reboiler provides full flexibility in the water balance control of the process. Typically, absorption liquor to be passed through the reboiler is withdrawn from a sump of the stripper and returned to the lower portion of the vapor/liquid contact zone 32 above the sump.

In primary stripper gas cooler/condenser 50, most of the water vapor content of the primary stripper gas effluent 33 is condensed and thus most of the latent heat removed by transfer to stripped condensate returning from condensate stripper 60. Aqueous condensate obtained by condensing water vapor from the primary stripper gas effluent comprises dissolved sulfur dioxide. This condensate is removed from cooler/condenser 50 and fed via line 58 to condensate stripper or water column 60 and heated (e.g., with steam or a reboiler) to desorb sulfur dioxide and produce a condensate stripper gas comprising water vapor and sulfur dioxide desorbed from the aqueous condensate. As shown in FIG. 1, condensate stripper gas is combined with wet sulfur dioxide-containing vent gas 59 from primary stripper gas cooler/condenser 50. The combined final condensate stripper gas 61 exiting the top of condensate stripper column 60 is cooled to a temperature normally below about 70° C. in a low temperature condenser 62 (e.g., with cooling water at 50° C.) to condense water vapor and produce a product stream 63 comprising recovered sulfur dioxide. As Shown in FIG. 1, marginal additional condensate can be wrung out of the condensate stripper gas, or the combined final condensate stripper gas 61 exiting the top of condensate stripper column 60, by passing the gas first through a heat exchanger 64 in which the condensate stripper gas is cooled by transfer of heat to a portion of the exhaust gas 19 exiting absorber 11. After cooling, the recovered sulfur dioxide product stream 63 is removed from the sulfur dioxide recovery process and directed to a destination where it may be used, e.g., to the drying tower or a catalytic stage of a contact sulfuric acid plant for conversion to sulfur trioxide, to a Claus process operation for generating elemental sulfur, to an alkali metal sulfite or bisulfite manufacturing process, to a papermaking operation, or to a compression and refrigeration unit for liquefaction to liquid sulfur dioxide.

Stripped condensate stream 51 depleted in sulfur dioxide exits the bottom of condensate stripper column 60 and is directed to the primary stripper gas cooler/condenser 50 wherein condensation of water vapor from the compressed primary stripper gas effluent 33 transfers heat to the stripper condensate, thereby generating steam for use as a combined heating medium and stripping gas (e.g., as a condensing stripping medium) in absorption liquor stripper 30. Optionally, a portion 56 may be purged from the system.

The extent of compression of primary stripper gas effluent 33 from absorption liquor stripper 30 is necessarily sufficient to bring the compressed vapor to a temperature high enough that steam having a pressure higher than the pressure in the lower (stripping) section of vapor/liquid contact zone 32 within tower 31 can be generated by heating stripped condensate in primary stripper gas cooler/condenser 50. But the extent of compression is preferably controlled to a minimum necessary for steam generated from stripped condensate to flow into the stripper. More particularly, it is preferred that steam is generated from stripped condensate at a temperature not more than about 30° C. higher than the temperature of the liquid phase within the absorption liquor stripper at liquid outlet 35 thereof, or more particularly, not more than about 20° C. or not more than about 5 to about 10° C. higher than the temperature of the liquid phase exiting the bottom of the vapor/liquid contact zone 32 within the stripper. In certain particularly preferred embodiments, the temperature of the steam produced by heating stripped condensate in the primary stripper gas cooler/condenser 50 is no more than equal to, or may be even lower than, the temperature of the liquid phase within the absorption liquor stripper at the liquid outlet thereof, or at the bottom of the vapor/liquid contact zone. More generally, it is preferred that the temperature of the steam generated in the primary stripper gas cooler/condenser 50 vary from the temperature of the regenerated absorption medium within the stripper at the liquid outlet thereof, or from the temperature of the liquid phase exiting the lower (stripping) section of the vapor/liquid contact zone within the absorption liquor stripper, by no more than about ±10° C. In order for steam to flow into the absorption liquor stripper, the pressure of the steam generated in the cooler/condenser 50 is necessarily higher than the total pressure in the stripper, and therefore higher than the equilibrium vapor pressure of the liquid phase within the stripping section of the vapor/liquid contact zone, even at the liquid phase exit of the stripping section where the partial pressure of sulfur dioxide approaches zero as a limit.

The consequent vapor phase water pressure driving force thus causes condensation of water vapor to occur in the stripper irrespective of temperature differences between the vapor phase and the liquid phase, resulting in condensation and heating of the liquid phase within the stripping section of the vapor/liquid contact zone even if the steam is introduced into the zone is a temperature no greater than, or even slightly below, the temperature of the liquid phase. Because of the depressant effect of the solute, i.e., a sorbent such as a polyprotic carboxylic acid salt, in the liquid phase, the vapor pressure of the liquid phase may be slightly lower than the pressure of the steam at the same temperature, or even where the temperature of the liquid phase is slightly higher than the temperature of the steam.

To meet these preferred conditions, the log mean temperature differential ($\Delta t$) in the primary stripper gas cooler/condenser is not less than about 1.5° C., about 2° C., about 3° C., about 4° C., or about 5° C. and no greater than about 10° C., about 8° C., about 6° C. or about 5° C. For example, the log mean temperature differential ($\Delta t$) in the primary stripper gas cooler/condenser is from about 1.5° to about 10° C., or from about 2° to about 9° C., or from about 2.5° to about 8° C.

Depending on the overall process energy and water balance, the volume of stripped condensate from condensate stripper 60 may exceed the demand for steam in the absorption liquor stripper 30. Thus, the stripped condensate may be usefully divided between (i) a condensate stream directed to the primary stripper gas cooler/condenser 50 as a cooling fluid for condensing water from the stripper gas, thereby converting the stripped condensate at least in part to steam for introduction to the absorption liquor stripper; and (ii) a discharge water stream for removal of water from the process.

A portion of stripped condensate from condensate stripper 60 as discharge water may also optionally be used to condition the sulfur dioxide-containing source gas or process feed gas stream 10. As shown in FIG. 1, stripped condensate from vapor-liquid separator 52 is passed through line 70 and introduced into a saturator 71 upstream of sulfur dioxide absorber 11 with respect to feed gas flow. The saturator may comprise a one stage contactor (e.g., generally consisting of a packed column or tower containing random or structured packing or a spray column), wherein the stripped condensate contacts the gas stream, thereby increasing the humidity of the feed gas entering the sulfur dioxide absorber. The water stream exiting the saturator may be removed from the process. The saturator also cools the sulfur dioxide-containing gas by evaporative cooling and removes acid gases (e.g., sulfuric acid, hydrochloric acid, sulfur trioxide) prior to entering the absorber. The saturator advantageously permits humidification of the feed gas stream utilizing lower quality water, which provides an incremental cost savings as compared to humidifying the gas in the absorber where the water utilized should be deionized or distilled to avoid the build-up of impurities. Although the water stream exiting the saturator is saturated with sulfur dioxide, the volume of this stream is small. Moreover, where, for example, sulfur dioxide is recovered from the tail gas of a sulfuric acid plant, the sulfur dioxide-laden water stream exiting the saturator can be used as dilution water in an $SO_3$ absorber. In an interpass plant, the water is advantageously used for dilution in the interpass absorber, and the minimal net flow of sulfur dioxide involved comes back through the sulfur dioxide recovery unit and is not lost from the process.

The process of FIG. 1 compresses the primary stripper gas effluent in order to provide the temperature differential whereby latent heat reclaimed by condensation of water vapor from the primary stripper gas is transferred to the stripped condensate for generation of the steam that is introduced to effect stripping of absorption liquor in the absorption liquor stripper. In accordance with the invention, other alternatives are provided for generating this temperature differential and driving the stripping operation.

Figure 2:
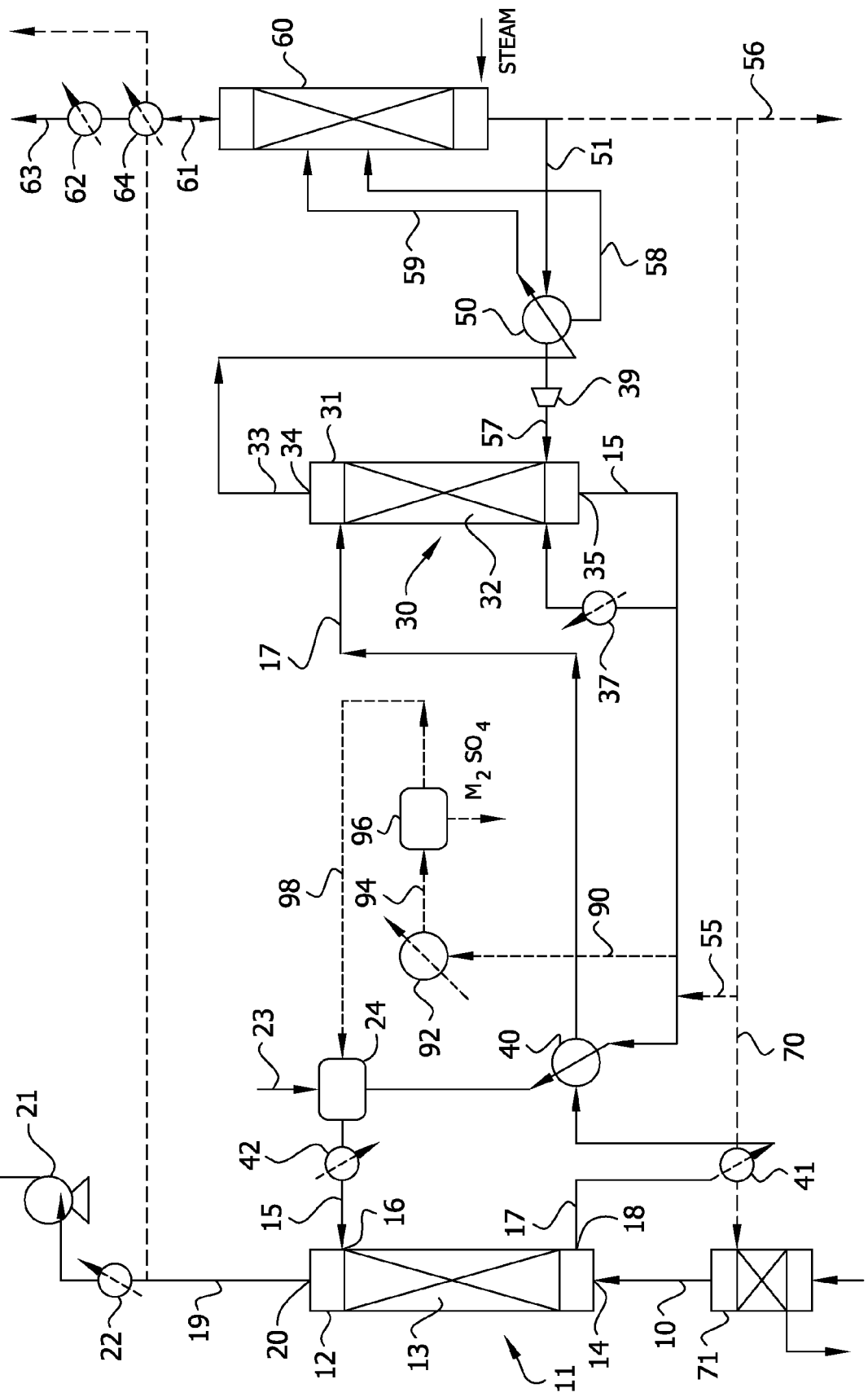

FIG. 2 illustrates an alternative to the process of FIG. 1 wherein the steam generated from the stripped condensate is compressed by a compressor 39 during flow between the steam outlet of the cooler/condenser 50 and the absorption liquor stripper 30. The drawing shows compression of the steam by a mechanical compressor, but the steam could also be introduced into the throat of a steam-jet ejector to achieve the requisite compression. The diameter of the stripper 30 is sized, and the packing or other mass transfer promoting structure within the vapor/liquid contact zone 32 of stripper 30 is designed, to avoid excessive pressure drop during passage of the gas/vapor phase upwardly through the zone. The primary stripper gas outlet 34 and line used to transfer the primary stripper gas effluent 33 to cooler/condenser 50 are also sized to avoid excessive pressure drop. By preserving a pressure on the primary stripper gas side of the cooler/condenser 50 that is higher than the pressure on the stripped condensate side of that exchanger, a temperature differential is established by which heat is transferred to the stripped condensate as water vapor condenses from the primary stripper gas effluent and steam is generated on the condensate side for use in stripper 30. The steam generated in the cooler/condenser 50 is introduced to the suction side of compressor 39 which compresses the steam for introduction into the stripper via line 57.

To recover the latent heat of condensation of water vapor from the stripping gas, compressor 39 increases the pressure of the steam to a level such that, when the primary stripper gas reaches cooler/condenser 50, the pressure on the stripper gas side of the cooler/condenser is higher than the pressure of the steam generated from the stripped condensate on the stripped condensate side of the cooler/condenser. More particularly, the extent of compression is sufficient such that the water saturation pressure at which water vapor condenses on the primary stripper gas side of the cooler/condenser is higher than the pressure at which steam is generated on the stripped condensate side of the cooler/condenser.

The temperature and pressure differential achieved in the process of FIG. 2 is preferably essentially the same as that which prevails in cooler/condenser 50 in the embodiment of FIG. 1 wherein the primary stripper gas effluent is compressed during flow from the gas outlet of the stripper to the gas inlet of the cooler/condenser. The absolute pressure prevailing in the vapor/liquid contact zone is preferably also in the same range for each of the embodiments respectively shown in FIGS. 1 and 2. In both cases, it is desirable to maintain a pressure slightly above atmospheric, e.g., about 15 to about 18 psia (about 100 to about 125 kPa absolute), in the stripper. However, because only steam is compressed in the process of FIG. 2, the optimal pressure within the absorption liquor stripping zone in the process of FIG. 2 may be marginally lower than the optimal pressure in the process of FIG. 1 wherein the sulfur dioxide component of the primary stripper gas must also be compressed while bringing the partial pressure of water vapor to a level at which the water vapor will condense at a temperature higher than the boiling water temperature on the stripped condensate side of cooler/condenser 50.

The remainder of the process of FIG. 2 is operated in a manner substantially identical to that described above with respect to FIG. 1.

Although the processes of FIGS. 1 and 2 provide comparable energy efficiency, an advantage of the process of FIG. 2 is the substantial absence of sulfur dioxide from the stream subject to compression. This means that the fluid being compressed is generally less corrosive than the fluid compressed in the process of FIG. 1, and thus provides savings in both maintenance and selection of materials of construction for the compressor or ejector.

Reliance on saturated steam generated from stripped condensate in the primary stripper gas cooler/condenser as the sole energy source for stripping sulfur dioxide from the absorption liquor can result in a net accretion of water in the regenerated absorption medium circulated back to the absorber, and ultimately in the sorbent medium circuit between the absorber and the stripper. In fact, any stripper operation that relies solely on live steam necessarily has this effect due to the increment of steam that must be added to provide the heat of vaporization of sulfur dioxide and the increment resulting from loss of heat to the environment. Thus, control of the water balance in this circuit requires some measure for removal of the water fraction that may otherwise be gained in this scheme of operation. Various options are available for this purpose. For example, energy supplied from an extraneous source in reboiler 37 may marginally increase the temperature of the primary stripper gas so that it carries a slightly higher water vapor load, and the primary stripper gas cooler/condenser can be operated at a marginally higher Δt and marginally higher vent gas temperature to remove a sufficient increment of water vapor to maintain the water balance. This may require marginally greater compression of the primary stripper gas in the embodiment of FIG. 1, or marginally greater compression of the stripping steam in the embodiment of FIG. 2. Alternatively, some or all the regenerated absorption liquor can by-pass interchanger 40 and/or trim cooler 42, thereby allowing the absorber to operate at a marginally higher temperature that incrementally increases the water vapor content of the exhaust gas to maintain the balance.

In typical operation of the process of FIG. 1, about a 2% gain in water volume is experienced during every turnover of the absorber/stripper circuit. In an embodiment wherein flue gas containing sulfur dioxide at levels reflecting the sulfur content of coal or other sulfur-containing carbon fuel is delivered to the absorber at 27° C., a balance can be achieved by by-passing the regenerated absorption medium around interchange 40 and trim cooler 42 and feeding the absorption medium into the absorber at 40° C. The exhaust gas leaving the absorber at 35° C. carries enough water vapor to balance the gain arising from the increment of steam necessary to vaporize the sulfur dioxide from the absorption liquor in the absorption liquor stripper.

Sulfur Dioxide Recovery from Rich Gas Streams

The process of the invention is suited for the recovery of sulfur dioxide from the tail gas of a contact sulfuric acid plant and other operations that generate relatively weak sulfur dioxide-containing effluents. However, it is applicable to other process operations that require sulfur dioxide recovery, including operations that generate relatively rich sulfur dioxide gas streams. Because the reactions for absorbing sulfur dioxide from a feed gas are typically exothermic, significant reaction heat is generated in the absorber where the process is used to recover sulfur dioxide from rich gases containing, e.g., from about 2 to about 4 vol. % sulfur dioxide or higher, including gas streams wherein the sulfur dioxide content may be as high as 10 vol. %, 15 vol. %, 20 vol. %, 25 vol. %, 30 vol. %, 40 vol. %, or even higher. For example, the sulfur dioxide concentration may at least about 4 vol. %, or at least about 5 vol. %, or at least about 10 vol. %, or at least about 15 vol. %, or at least about 20 vol. %, or at least about 30 vol. %.

The process of the invention is quite readily adaptable to recovering sulfur dioxide from such rich sulfur dioxide-containing gas streams. However, where the sulfur dioxide content of the gas stream is high, sensible heat generated in the exothermic absorption reaction may sharply increase the temperature of the absorption liquor, in some instances to levels that can seriously compromise absorption efficiency and/or the absorptive capacity of the circulating absorption medium. For example, in an absorption system using tetraglyme as the sorbent, where the sulfur dioxide concentration of the incoming feed gas reaches 2.9 vol. %, the temperature of the absorption liquor can increase from a typically preferred temperature of 17° C. to a temperature of 30° C. at otherwise appropriate L/G ratios in the absorber. Where the sulfur dioxide content of the incoming gas is 43 mole %, the temperature can typically increase from 17° to 49° C. For a tetraglyme absorption system, such temperature rises may seriously compromise the capacity of the absorption medium for absorption of sulfur dioxide.

Figure 3:
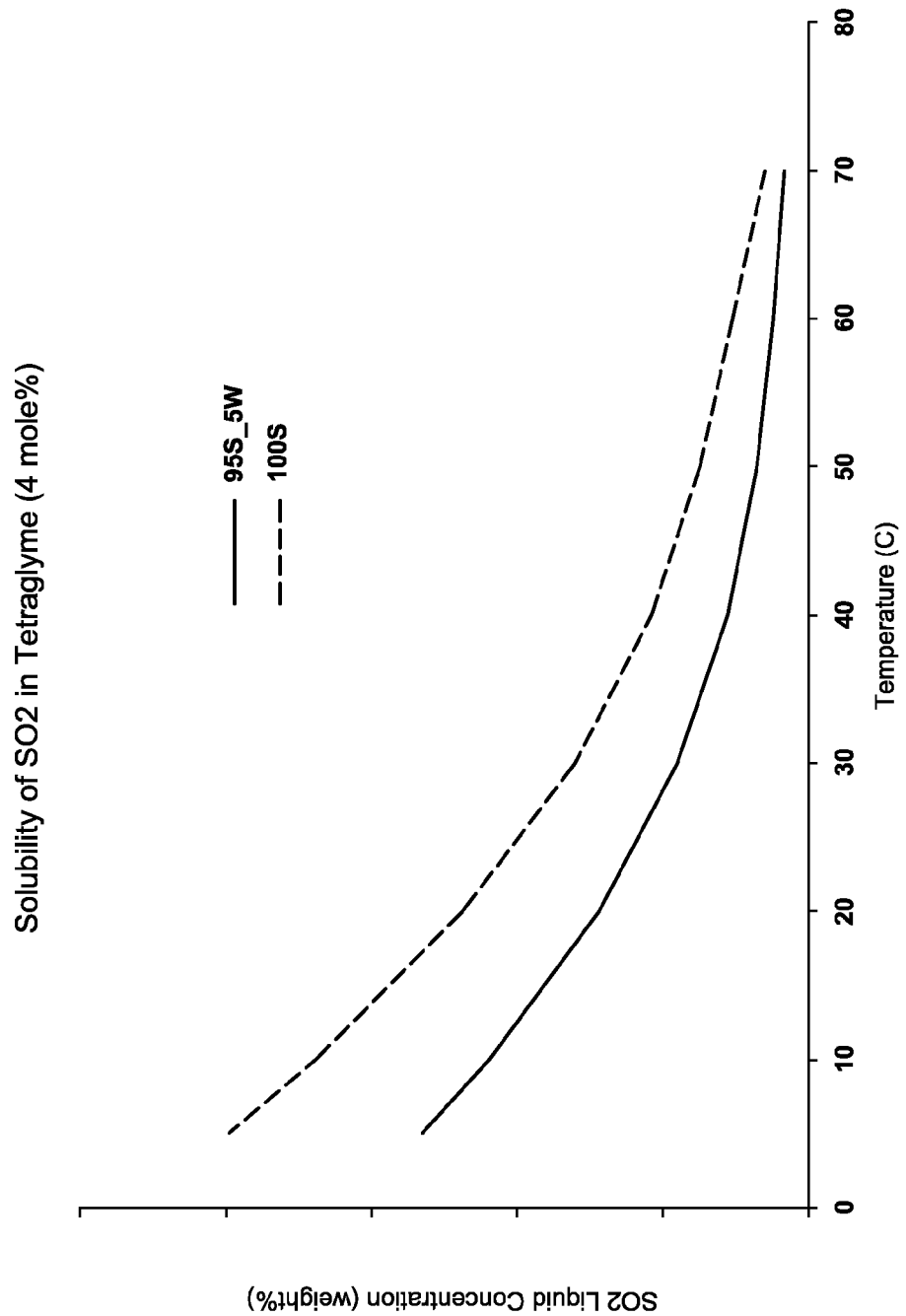
FIGS. 3 and 4 are curves plotting the solubility of sulfur dioxide in certain absorption solvents as a function of temperature.
Figure 4:
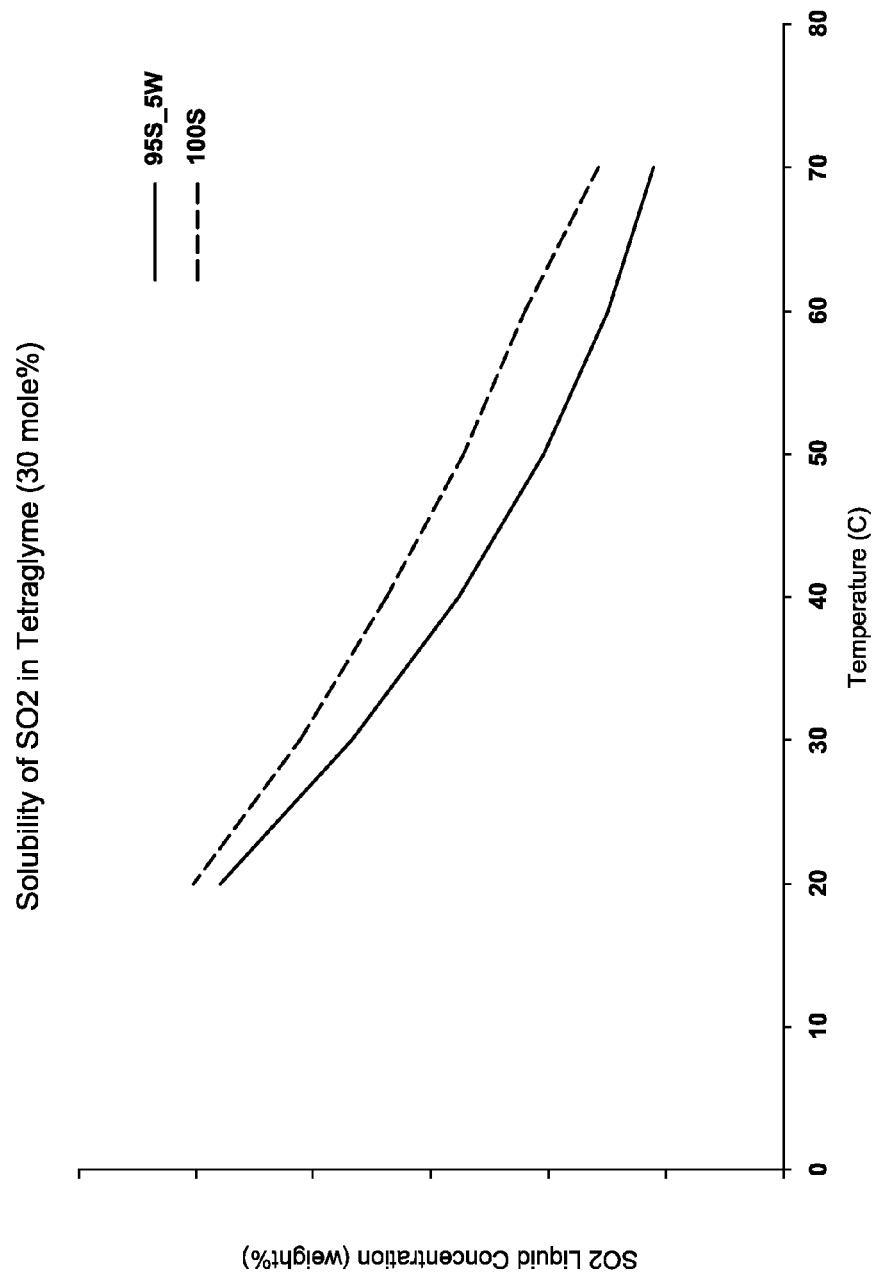

FIGS. 3 and 4 illustrate the adverse effect of temperature on the equilibrium absorptive capacity of two known sulfur dioxide absorption solvents. As illustrated in FIG. 3, using 100 wt. % tetraglyme (100S) as the sorbent at 4 mole % $SO_2$ in the gas, the sorptive capacity of the absorption medium declines significantly as the temperature rises even in the narrow range from 20° to 30° C. The absorptive capacity continues to fall at even higher temperatures, although the decline is less drastic. As illustrated in FIG. 4, where the feed gas contains 30 mole % $SO_2$, the absorptive capacity of pure tetraglyme (100S) decreases more uniformly as the temperature increases. As also shown in FIGS. 3 and 4, comparable declines in absorptive capacity are incurred using another tetraglyme sorbent, i.e., 955__5 W (95 wt. % tetraglyme and 5 wt. % water). Thus, for rich gases containing more than 2 vol. % sulfur dioxide, increased absorption medium flows are generally required to reduce the extent of temperature rise in the liquid phase passing through the absorber which results in relatively lower sulfur dioxide concentrations in the sulfur dioxide-enriched absorption liquor.

The increased flow of absorption medium and absorption liquor taxes the absorption liquor stripper in two important ways. It increases the energy demand for heating the absorption liquor to the proper temperature for stripping the sulfur dioxide therefrom, thus reducing the energy efficiency of the process. But it also imposes an increased mass flow throughout the stripping column, which increases the diameter of the entire column required to accommodate the liquid flow without flooding the vapor/liquid contact zone. The higher liquid phase flow rates also dictate an increased diameter of the absorption column as well.

In accordance with a further preferred feature of the sulfur dioxide absorption process, cooling is provided at the base of the absorber in order to reduce the temperature rise in the absorption medium in its passage through the absorption (i.e., gas/liquid contact) zone, and thus enable both the absorber and stripper to be operated at relatively low L/G ratios. Controlling the temperature rise in the absorption medium, especially in the lower portion of the absorption zone, preserves the equilibrium capacity of the absorption medium, and thus preserves the driving force for mass transfer of sulfur dioxide from the gas phase to the liquid phase within the absorption zone as well as the driving force for reaction of sulfur dioxide with the sorbent in the liquid phase. Relatively lower liquid phase temperatures also favor the extent of conversion to the sulfur dioxide adduct within the liquid phase where the reaction between sulfur dioxide and sorbent is an exothermic equilibrium reaction. Preferably, absorption liquor is withdrawn from the gas liquid/contact zone within the absorber, circulated through an external heat exchanger and returned to the absorption zone. More particularly, the circulating absorption liquor is removed from the gas/liquid contact zone in a region spaced below the region to which the cooled circulating absorption liquor is returned to the zone, thus defining a section within the absorption zone below the region to which cooled absorption liquor is returned within which the bulk of the absorption of sulfur dioxide preferably occurs and the bulk of the heat of absorption is generated.

Figure 5:
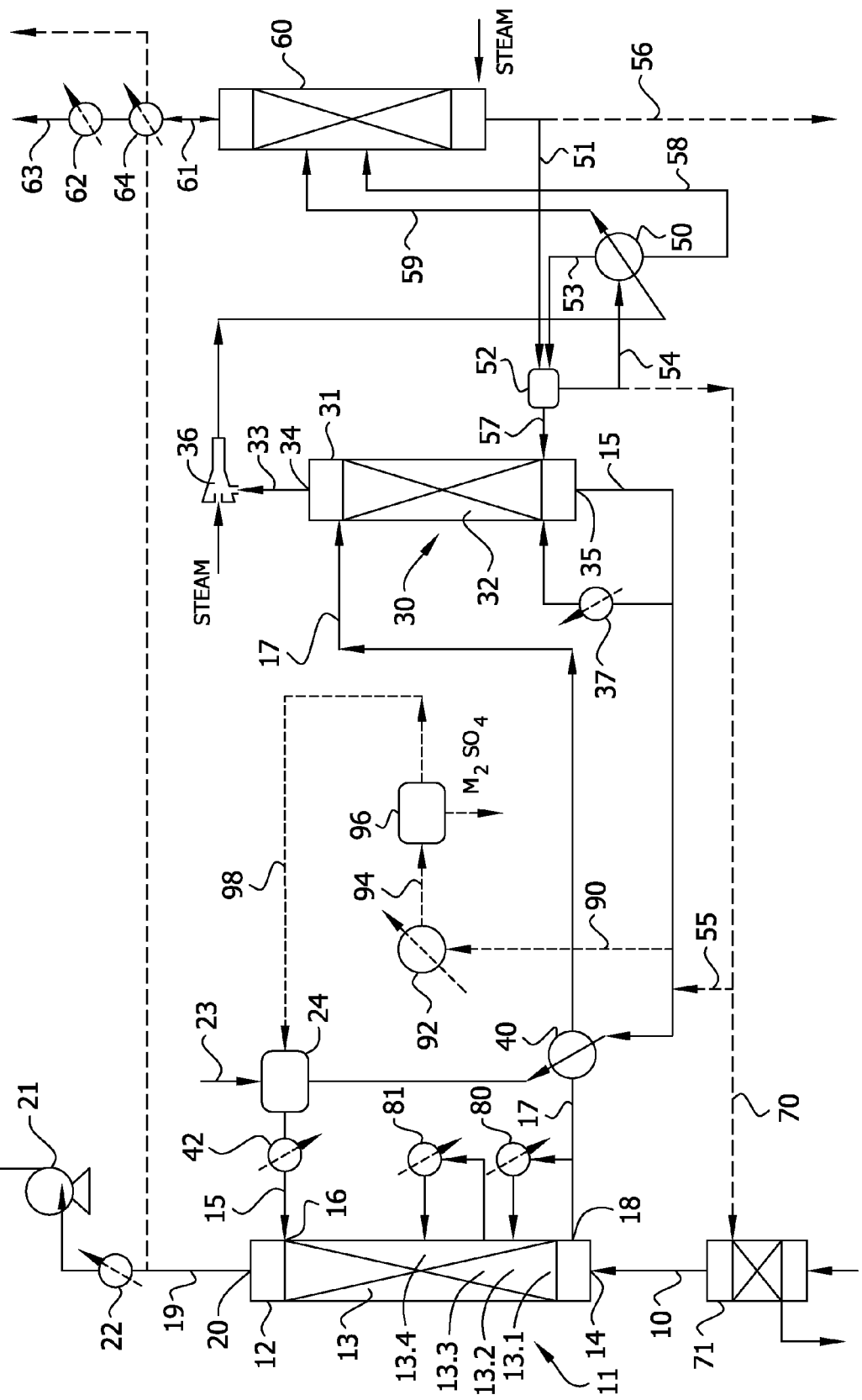
FIG. 5 is a flowsheet of an absorption/desorption process for selectively removing and recovering sulfur dioxide from a sulfur dioxide-containing source gas in which absorption liquor is circulated between the absorber and one or more external heat exchangers to cool the absorption liquor and enhance the capacity of the absorption medium for transfer of sulfur dioxide from the gas phase.

For example, as illustrated in FIG. 5, a portion of hot sulfur dioxide-enriched absorption liquor 17 is withdrawn from liquid exit 18 or withdrawn from a region 13.1 near the bottom of vertical gas/liquid contact zone 13 in absorber 11 and circulated through an external heat exchanger 80 where heat of absorption is removed by transfer to a cooling fluid. The cooled absorption liquor is returned to the absorber in a region 13.2 of the gas/liquid contact zone that is spaced above the region from which the hot absorption liquor is withdrawn, but spaced below the top of the gas/liquid contact zone. More preferably, the region 13.2 to which the cooled circulating absorption liquor is returned is in the lower portion of the gas/liquid contact zone.

Circulation of absorption liquor between the sulfur dioxide absorber 11 and the external heat exchanger 80 causes increased mass flow and unavoidable back mixing of the absorption liquor in the circulation section of the absorption zone falling between regions 13.1 and 13.2, and this can marginally offset the gain in mass transfer for removal of sulfur dioxide in this section of the zone. Preferably, therefore, return region 13.2 is spaced by the height of at least one transfer unit below the top of the gas/liquid contact zone, thereby defining a rectification section of the absorption zone comprising at least one transfer unit below the top of the zone. Preferably, the rectification section comprises at least two transfer units. It is also preferred that the return region 13.2 is spaced by the height of at least one transfer unit, more preferably at least two transfer units above withdrawal region 13.1. To accommodate adequate mass transfer capacity in both the circulation section of the absorption zone between return region 13.2 and withdrawal region 13.1 and the rectification section between return region 13.2 and the top of the absorption zone, the absorption zone as a whole preferably comprises at least three, more preferably at least four transfer units. Because both gas and liquid streams are in substantial plug flow within the rectification section, a maximum driving force for mass transfer is provided in that section, allowing reduction of the sulfur dioxide concentration in the exhaust gas to a level satisfying emission standards. Proper selection of the location for the circulating liquid return region 13.2 is based on selection of a region wherein sulfur dioxide level in the gas flowing upwardly therefrom is not high enough to generate absorption/reaction heat in the rectification section that would have a significant adverse effect on absorptive capacity of the aqueous absorption medium, or on the mass transfer driving force in the rectification section.

Preferably, where the sorbent is tetraglyme, region 13.2 to which cooled circulating absorption liquor is returned to the gas/liquid contact zone is maintained at a temperature not greater than about 40° C., more preferably not greater than about 30° C., most typically from about 15° to about 25° C. In a tetraglyme system, the temperature of region 13.1 from which the hot circulating absorption liquor is removed from the gas/liquid contact zone is preferably maintained at a temperature not greater than about 45° C., more preferably not greater than 35° C., most typically from about 15° to about 30° C. Those skilled in the art will recognize that different, in some cases substantially different, temperature ranges are optimal for other sorbents. For example, where the sorbent is sodium malate, region 13.2 to which cooled circulating absorption liquor is returned to the gas/liquid contact zone is maintained at a temperature not greater than about 45° C., more preferably not greater than about 45° C., most typically from about 20° to about 40° C. In this case, the temperature of region 13.1 from which the hot circulating absorption liquor is removed from gas/liquid contact zone is preferably maintained at a temperature not greater than about 50° C., more preferably not greater than 40° C., most typically from about 25° to about 35° C. In each case, the rate of circulation between regions 13.1 and 13.2 is dictated by these temperature constraints and the unit energy generation of the absorption process.

Conveniently, a forward flow fraction of hot sulfur dioxide-enriched absorption liquor 17 is withdrawn from the circulating absorption liquor stream upstream of the external heat exchanger 80 and directed to absorption liquor stripper 30.

Figure 6:
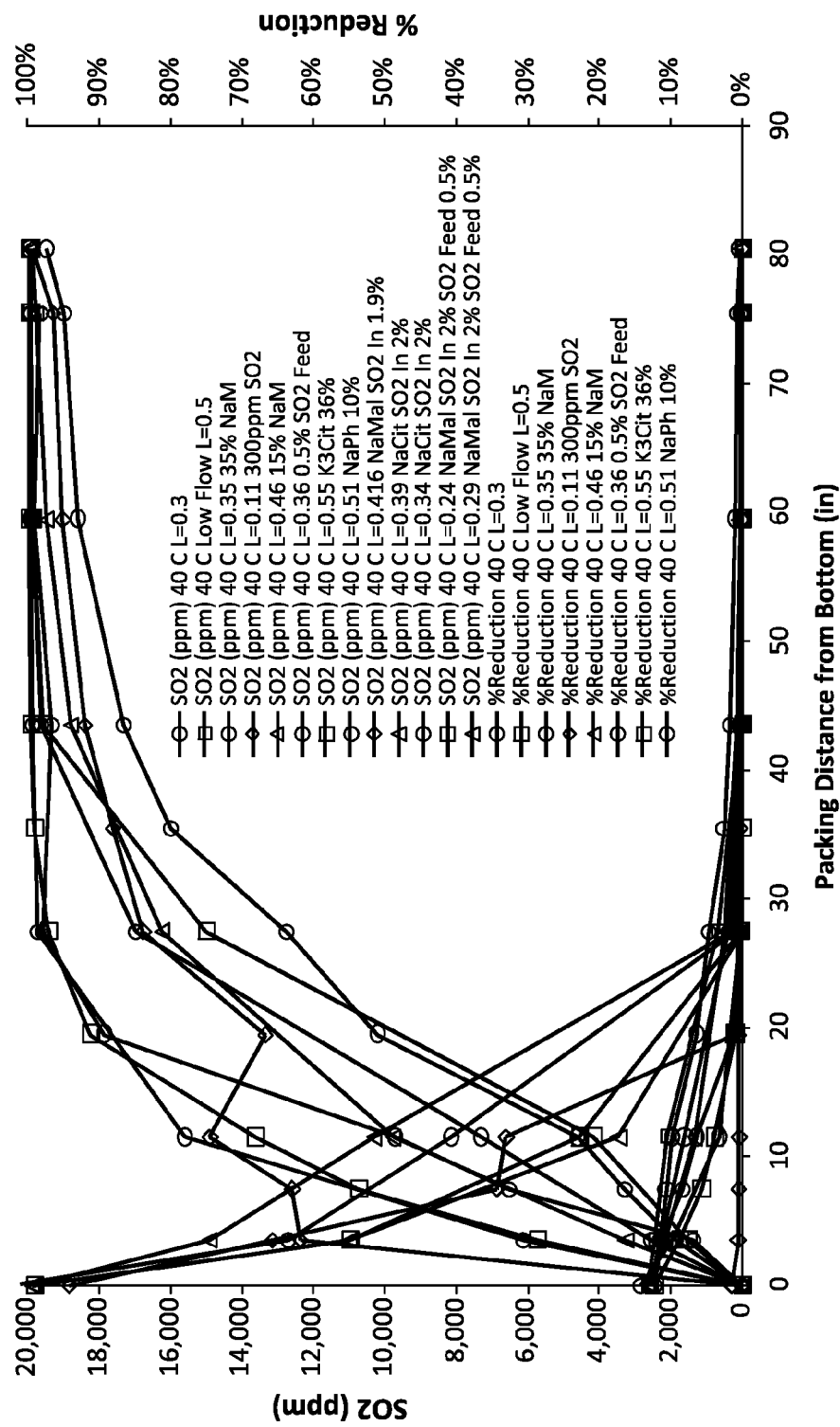
FIG. 6 plots sulfur dioxide content in the gas phase and percent recovery of sulfur dioxide from the gas phase as a function of distance from the bottom of a countercurrent absorber for various combinations of gas composition, absorption medium composition, and liquid flow rate.

Location of the circulating absorption liquor return region 13.2 can be selected based on the absorption profile for the sulfur dioxide absorption zone. Typical profiles using different absorption media are illustrated in FIG. 6.

Where absorption is immediate and substantially quantitative upon contact of the feed gas with the absorption medium in the gas/liquid contact zone, a single absorption liquor cooling circuit is ordinarily sufficient to preserve absorption efficiency and control the volumetric flow of absorption liquor to a level consistent with efficient energy usage in the absorption liquor stripper. However, where the affinity of the sorbent for sulfur dioxide is more limited, as is also desirable for purposes of efficient operation of the absorption liquor stripper, the sulfur dioxide concentration gradient through the absorption zone, i.e., the rate at which the concentration of sulfur dioxide in the gas stream (and the liquid stream) decrease with distance above the gas inlet to the absorption zone, may be only modest. In such circumstances, greater efficiency in operation of the absorber and the stripper may be realized by using two or more cooling loops spaced vertically along the gas flow path within the absorption (i.e., gas/liquid contact) zone. For example, as illustrated in FIG. 5, two such cooling loops are shown. In the second cooling loop, a second portion of hot sulfur dioxide-enriched absorption liquor descending gas/liquid contact zone 13 of absorber 11 is withdrawn from a region 13.3 above region 13.2 to which cooled circulating absorption liquor is returned to the gas/liquid contact zone in the first cooling loop and circulated through an external heat exchanger 81 where heat of absorption is removed by transfer to a cooling fluid. The cooled absorption liquor is returned to the absorber in a region 13.4 of the gas/liquid contact zone that is spaced above region 13.3 from which the hot absorption liquor is withdrawn, but spaced below the top of the gas/liquid contact zone.

Figure 7:
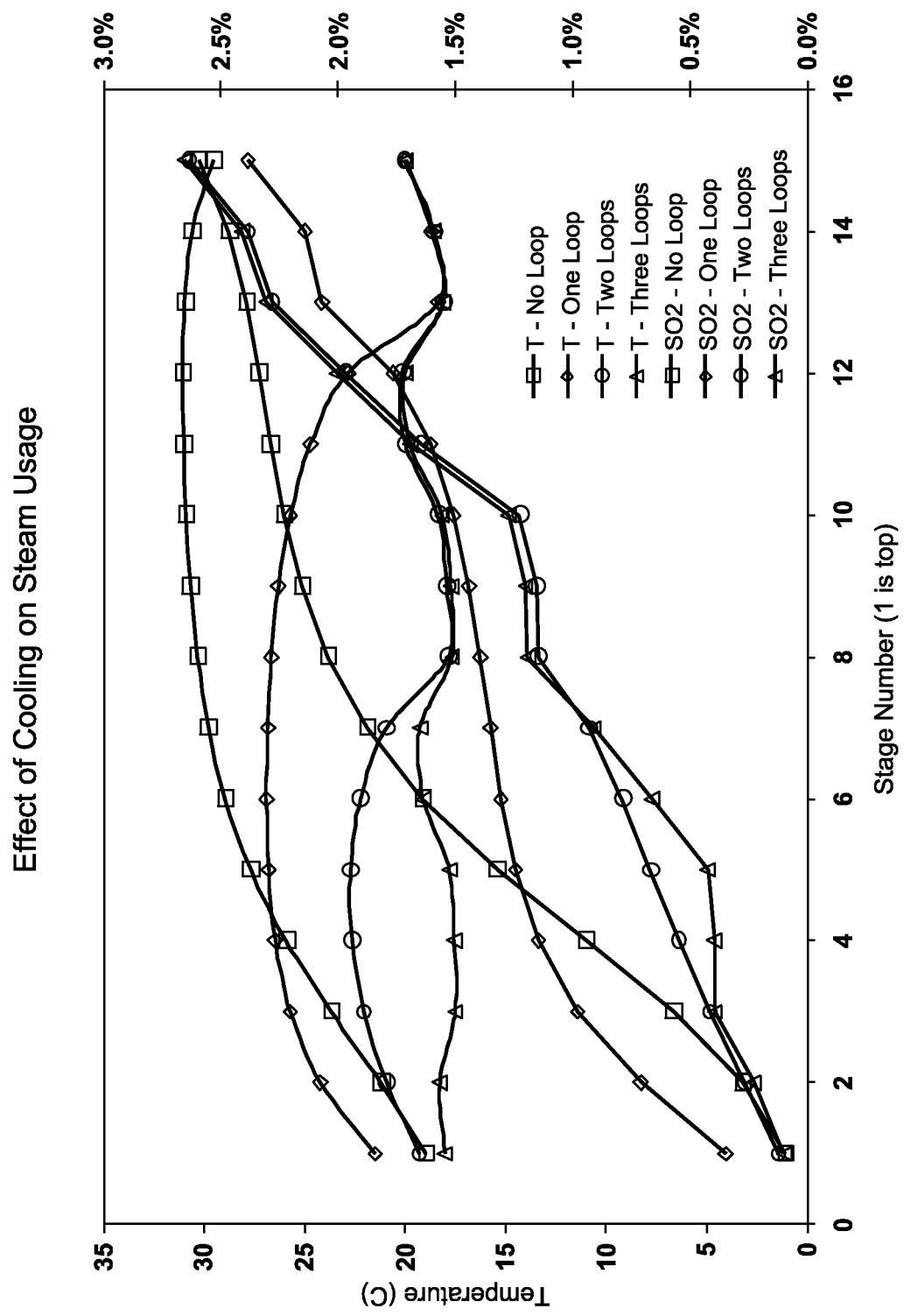
FIG. 7 depicts profiles of absorption liquor temperature and mole percent sulfur dioxide in the vapor phase for an absorption/desorption process for sulfur dioxide recovery in which different numbers of cooling loops are provided for the absorber.

FIG. 7 illustrates the operation of an absorber/stripper system in which sulfur dioxide has only a modest affinity for the sorbent, so that the sulfur dioxide gradient is relatively shallow. FIG. 7 plots the temperature of the absorption liquor and the sulfur dioxide concentration in the gas stream within the absorption zone, in each instance as a function of the location in the absorption zone expressed as the distance in transfer units from the top, i.e., gas outlet of the zone, with different curves for systems respectively containing no cooling loops, one cooling loop, two cooling loops, and three cooling loops. Data on the effect of one, two, or three cooling loops are also set forth below in Table 1.

TABLE 1

Impact of Cooling Loops on Steam Requirements

|  | Number of cooling loops on absorber | | | |
| --- | --- | --- | --- | --- |
|  | 0 | 1 | 2 | 3 |
| Absorber Bottom Temperature (° C.) | 30 | 20 | 20 | 20 |
| Emissions ($SO_2$ ppm) | 929 | 948 | 970 | 985 |
| Solvent Flow (MM lb/hr) | 2.1 | 1.6 | 1.3 | 1.3 |
| Reboiler Duty (MM Btu/hr) | 70.5 | 59.4 | 53.3 | 52.7 |
| Steam:$SO_2$ Ratio | 1.1 | 0.93 | 0.83 | 0.82 |
| Savings on Steam | 0% | 15.70% | 24.40% | 25.20% |

The data plotted in FIG. 7 and tabulated in Table 1 are from a sulfur dioxide absorption system in which the absorber comprises 15 stages (essentially corresponding to transfer units). In each case where circulating absorption liquor is cooled, there is at least one loop wherein the withdrawal region is stage 15 and the return region is stage 13, i.e., the return region is spaced by the height of essentially two transfer units from the bottom of the absorption zone and spaced by the height of 12 units from the top of the zone. Where a second loop is added, the withdrawal region is stage 10 and the return region is stage 8, and where a third loop is used, the withdrawal region is stage 5 and the return region is stage 3.

These plots and tabulations graphically illustrate the value of one or more cooling loops in contributing to the overall energy efficiency of the process. As indicated in Table 1, one cooling loop decreases steam usage in the absorption liquor stripper by about 15% as compared to operation with no cooling. Operation with two cooling loops reduces steam consumption by 24% compared to operation with no cooling; and operation with three loops reduces steam consumption by 25% compared to operation with no cooling. Without cooling, the temperature reaches a maximum of 31° C. The maximum temperature drops to 27° C., 22.5, and 19° C., respectively with the introduction of one, two, or three cooling circuits.

By comparison with the system whose operation is reflected in FIG. 7 and Table 1, only a single cooling loop would typically be justified in a sulfur dioxide absorption process which uses a polyprotic acid such as sodium malate as the sorbent.

The remainder of the process as illustrated in FIG. 5 is operated substantially in the manner described above with reference to FIG. 1 or FIG. 2. However, it should be understood that controlling the temperature rise in the absorption medium within absorber 11 in accordance with the present invention may be practiced independently of providing a source of energy for generating stripping steam by compressing the primary stripper gas effluent or steam generated from the stripped condensate (i.e., the process may depend entirely on reboiler 37 as a source of energy for absorption liquor stripping column 30).

When introducing elements of the present invention or the preferred embodiments(s) thereof, the articles "a", "an", and "the" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

What is claimed is:
1. A process for selectively removing and recovering a contaminant gas from a contaminant-containing source gas, the process comprising:
contacting a feed gas stream comprising the source gas in a contaminant gas absorber with an aqueous absorption medium comprising a sorbent for the contaminant gas, thereby absorbing contaminant gas from the feed gas stream into the absorption medium and producing an exhaust gas from which contaminant gas has been removed and a contaminant-enriched absorption liquor;
contacting the contaminant-enriched absorption liquor with stripping steam in an absorption liquor stripper to desorb the contaminant from the contaminant-enriched absorption liquor and thereby produce a regenerated contaminant absorption medium and a primary stripper gas effluent comprising water vapor and contaminant gas;
withdrawing regenerated absorption medium from a liquid outlet of the absorption liquor stripper and primary stripper gas effluent from a vapor outlet of the absorption liquor stripper;
compressing the primary stripper gas effluent;
condensing water from the compressed primary stripper gas effluent by indirect transfer of heat from the compressed primary stripper gas effluent to a cooling medium in a primary stripper gas cooler/condenser to thereby produce a contaminant-bearing condensate;
contacting the contaminant-bearing condensate exiting the primary stripper gas cooler/condenser with steam in a condensate stripper to produce a stripped condensate and a condensate stripper gas effluent containing water vapor and contaminant gas;
wherein the cooling medium to which heat is transferred from the compressed primary stripper gas effluent in the primary stripper gas cooler/condenser comprises at least a portion of the stripped condensate, thereby generating steam from the stripped condensate at a pressure in excess of the pressure within the absorption liquor stripper at the liquid outlet thereof; and
introducing steam generated from the stripped condensate in the primary stripper gas cooler/condenser into the absorption liquor stripper as stripping steam for contact with contaminant-enriched absorption liquor to desorb contaminant therefrom.

2. The process as set forth in claim 1 wherein the absorption liquor stripper comprises a column comprising a vertical vapor/liquid contact zone and steam generated in the primary stripper gas cooler/condenser is introduced at the bottom of the vapor/liquid zone and contaminant-enriched absorption liquor is introduced at the top of the vapor/liquid zone.

3. The process as set forth in claim 2 wherein primary stripper gas effluent is withdrawn from the vapor outlet of the absorption liquor stripper at the top of the vapor/liquid contact zone and regenerated contaminant absorption medium is withdrawn from the liquid outlet of the absorption liquor stripper at the bottom of the vapor/liquid contact zone.

4. The process as set forth in claim 2 wherein steam generated from the stripped condensate in the primary stripper gas cooler/condenser is introduced into the bottom of the vapor/liquid contact zone of the absorption liquor stripper and at least a portion of the steam condenses within the vapor/liquid contact zone to heat the liquid phase, thereby reducing the equilibrium contaminant concentration in the liquid phase and enhancing the driving force for transfer of contaminant to the vapor phase.

5. The process as set forth in claim 2 wherein the temperature of the steam introduced from the primary stripper gas cooler/condenser into the absorption liquor stripper is equal to or lower than the temperature of the liquid phase within the absorption liquor stripper at the liquid outlet thereof, or at the bottom of the vapor/liquid contact zone.

6. The process as set forth in claim 2 wherein the temperature of the steam introduced from the primary stripper gas cooler/condenser into the absorption liquor stripper is not more than about 5° to about 10° C. higher than the temperature of the liquid phase within the absorption liquor stripper at the liquid outlet thereof, or at the bottom of the vapor/liquid contact zone.

7. The process as set forth in claim 2 wherein the temperature of steam introduced from the primary stripper gas cooler/condenser into the absorption liquor stripper varies from the temperature of the liquid phase within the absorption liquor stripper at the liquid outlet thereof, or from the temperature of the liquid phase at the bottom of the vapor/liquid contact zone, by no more than about ±10° C.

8. The process as set forth in claim 1 wherein the log mean temperature differential ($\Delta t$) in the primary stripper gas cooler/condenser is from about 1.5° to about 10° C.

9. The process as set forth in claim 1 wherein the pressure of the primary stripper gas effluent exiting the absorption liquor stripper is from about 40 and about 170 kPa absolute.

10. The process as set forth in claim 1 wherein compression of the primary stripper gas effluent from the absorption liquor stripper increases its pressure by from about 30 to about 65 kPa.

11. The process as set forth in claim 1 wherein the primary stripper gas effluent from the absorption liquor stripper is compressed by passage through a steam-jet ejector and the compressed primary stripper gas is introduced into the primary stripper gas cooler/condenser.

12. The process as set forth in claim 1 wherein the stripped condensate from the condensate stripper is divided to provide: (i) a condensate stream directed to the primary stripper gas cooler/condenser as the cooling medium for condensing water from the primary stripper gas effluent and generation of steam for introduction to the absorption liquor stripper; and (ii) a discharge water stream for removal of water from the process.

13. The process as set forth in claim 12 wherein at least a portion of the discharge water stream is contacted with the contaminant-containing source gas or the feed gas stream in a saturator upstream of the contaminant gas absorber with respect to feed gas flow, thereby increasing the humidity of the feed gas stream entering the contaminant gas absorber.

14. The process as set forth in claim 13 wherein the water stream exiting the saturator is removed from the process.

15. The process as set forth in claim 1 wherein regenerated aqueous absorption medium is recirculated to the contaminant gas absorber for further absorption of contaminant from further flow of the feed gas stream.

16. The process as set forth in claim 15 wherein recirculated regenerated aqueous absorption medium is passed through an absorption liquor interchanger in the course of recirculation from the absorption liquor stripper to the contaminant gas absorber, contaminant-enriched absorption liquor is passed through the interchanger in the course of transfer from the contaminant gas absorber to the absorption liquor stripper, and heat is transferred from regenerated absorption medium to contaminant-enriched absorption liquor within the interchanger.

17. The process as set forth in claim 1 wherein contaminant gas-enriched absorption liquor is circulated between the contaminant gas absorber and an external heat exchanger where heat of absorption is removed by transfer to a cooling fluid.

18. The process as set forth in claim 1 wherein the contaminant gas comprises sulfur dioxide.

19. The process as set forth in claim 1 further comprising circulating a portion of the regenerated absorption medium withdrawn from the absorption liquor stripper through a reboiler wherein it is heated with steam from an extraneous source.

20. The process as set forth in claim 1 wherein the log mean temperature differential ($\Delta t$) in the primary stripper gas cooler/condenser is no greater than about 10° C.

21. The process as set forth in claim 1 wherein the log mean temperature differential ($\Delta t$) in the primary stripper gas cooler/condenser is not less than about 1.5° C.

22. The process as set forth in claim 1 wherein a final stripper gas is passed through a trim condenser for condensation of water vapor contained therein, the final stripper gas comprising a stream combining condensate stripper gas effluent and a vent gas from the primary stripper gas cooler/condenser.

23. The process as set forth in claim 22 wherein condensate from the trim condenser is returned to the condensate stripper.

24. The process as set forth in claim 23 wherein the exhaust gas from which contaminant gas has been removed exits the contaminant gas absorber and is passed through a contaminant gas trim cooler wherein heat is transferred from a final stripper gas effluent to the exhaust gas, the final stripper gas effluent comprising a stream combining condensate stripper gas effluent and a vent gas from the primary stripper gas cooler/condenser.

25. The process as set forth in claim 24 wherein the contaminant gas trim cooler is upstream of the trim condenser with respect to the flow of the final stripper gas effluent.

26. The process as set forth in claim 1 wherein the contaminant gas is selected from the group consisting of $SO_2$, $CO_2$, $NO_x$, $H_2S$, HCl and ammonia.

27. The process as set forth in claim 1 wherein the contaminant gas comprises an acid gas.

28. A process for selectively removing and recovering a contaminant gas from a contaminant-containing source gas, the process comprising:
  contacting a feed gas stream comprising the source gas in a contaminant absorber with an aqueous absorption medium comprising a sorbent for the contaminant gas, thereby absorbing contaminant from the feed gas stream into the absorption medium and producing an exhaust gas from which contaminant has been removed and a contaminant-enriched absorption liquor;

contacting the contaminant-enriched absorption liquor with stripping steam in an absorption liquor stripper to desorb the contaminant from the contaminant-enriched absorption liquor and thereby produce a regenerated contaminant absorption medium and a primary stripper gas effluent comprising water vapor and contaminant gas;

withdrawing regenerated absorption medium from a liquid outlet of the absorption liquor stripper and primary stripper gas effluent from a vapor outlet of the absorption liquor stripper;

condensing water from the primary stripper gas effluent by indirect transfer of heat from the primary stripper gas effluent to a cooling medium in a primary stripper gas cooler/condenser to thereby produce a contaminant-bearing condensate;

contacting the contaminant-bearing condensate exiting the primary stripper gas cooler/condenser with steam in a condensate stripper to produce a stripped condensate and a condensate stripper gas effluent containing water vapor and contaminant gas;

wherein the cooling medium to which heat is transferred from the primary stripper gas effluent in the primary stripper gas cooler/condenser comprises at least a portion of the stripped condensate, thereby generating steam from the stripped condensate;

compressing the steam generated from the stripped condensate in the primary stripper gas cooler/condenser at a pressure in excess of the pressure within the absorption liquor stripper at the liquid outlet thereof; and introducing the compressed steam into the absorption liquor stripper as stripping steam for contact with contaminant-enriched absorption liquor to desorb contaminant therefrom.

29. A process for selectively removing and recovering a contaminant gas from a contaminant-containing source gas, the process comprising:

contacting a feed gas stream comprising the source gas in a contaminant absorber with an aqueous absorption medium comprising a sorbent for the contaminant gas, thereby absorbing contaminant from the feed gas stream into the absorption medium and producing an exhaust gas from which contaminant has been removed and a contaminant-enriched absorption liquor;

contacting the contaminant-enriched absorption liquor with stripping steam in an absorption liquor stripper to desorb the contaminant from the contaminant-enriched absorption liquor and thereby produce a regenerated contaminant absorption medium and a primary stripper gas effluent comprising water vapor and contaminant gas;

withdrawing regenerated absorption medium from a liquid outlet of the absorption liquor stripper and primary stripper gas effluent from a vapor outlet of the absorption liquor stripper;

condensing water from the primary stripper gas effluent by indirect transfer of heat from the primary stripper gas effluent to a cooling medium in a primary stripper gas cooler/condenser to thereby produce a contaminant-bearing condensate;

contacting the contaminant-bearing condensate exiting the primary stripper gas cooler/condenser with steam in a condensate stripper to produce a stripped condensate and a condensate stripper gas effluent containing water vapor and contaminant gas;

wherein the cooling medium to which heat is transferred from the primary stripper gas effluent in the primary stripper gas cooler/condenser comprises at least a portion of the stripped condensate, thereby generating steam from the stripped condensate; and introducing steam generated from the stripped condensate in the primary stripper gas cooler/condenser into the absorption liquor stripper as stripping steam for contact with contaminant-enriched absorption liquor to desorb contaminant therefrom.

30. The process as set forth in claim 29 wherein steam is generated in the primary stripper gas cooler/condenser at a pressure lower than the water saturation pressure at the temperature at which water vapor condenses from the primary stripper gas in the gas cooler/condenser.

31. The process as set forth in claim 29 wherein steam is generated in the primary stripper gas cooler/condenser at a pressure lower than the pressure of the primary stripper gas in the primary stripper gas cooler/condenser.

32. The process as set forth in claim 29 wherein the primary stripper gas is compressed during flow between the gas outlet of the absorber and the gas inlet of the primary stripper gas cooler/condenser.

33. The process as set forth in claim 29 wherein steam generated in the primary stripper gas cooler/condenser is compressed during flow between the steam outlet of the primary stripper gas cooler and the steam inlet of the absorption liquor stripper.

34. A process for removing a contaminant gas from a contaminant-containing source gas, the process comprising:

contacting a feed gas stream comprising the source gas in a contaminant gas absorber with an aqueous absorption medium comprising a sorbent for the contaminant gas, thereby absorbing contaminant gas from the feed gas stream into the absorption medium and producing an exhaust gas from which contaminant gas has been removed and a contaminant-enriched absorption liquor, the contaminant gas absorber comprising a column comprising a vertical countercurrent gas/liquid contact zone comprising a plurality of transfer units, the feed gas stream is introduced at the bottom of the gas/liquid contact zone, the contaminant gas absorption medium is introduced at the top of the gas/liquid contact zone, the exhaust gas is removed from the top of the gas/liquid contact zone, and contaminant-enriched absorption liquor is removed from the bottom of the gas/liquid contact zone; and circulating at least a portion of the contaminant gas-enriched absorption liquor between the absorber and an external heat exchanger where heat of absorption is removed by transfer to a cooling fluid, wherein the cooled circulating absorption liquor is returned to the gas/liquid contact zone in a region spaced by the height of at least one transfer unit below the top of the gas/liquid contact zone; and the hot circulating absorption liquor is removed from the gas/liquid contact zone in a region spaced by the height of at least one transfer unit below the region to which the cooled circulating absorption liquor is returned to the gas/liquid contact zone.

35. The process as set forth in claim 34 wherein the cooled circulating absorption liquor is returned to the gas/liquid contact zone in a region spaced by the height of at least two transfer units below the top of the gas/liquid contact zone.

36. The process as set forth in claim 34 wherein the cooled circulating absorption liquor is returned to the gas/liquid contact zone in a region spaced by the height of at least three transfer units below the top of the gas/liquid contact zone.

37. The process as set forth in claim 34 wherein the hot circulating absorption liquor is removed from the gas/liquid contact zone in a region spaced by the height of at least two transfer units below the region to which the cooled circulating absorption liquor is returned to the gas/liquid contact zone.

38. The process as set forth in claim 34 wherein the hot circulating absorption liquor is removed from the gas/liquid contact zone in a region spaced by the height of at least three transfer units below the region to which the cooled circulating absorption liquor is returned to the gas/liquid contact zone.

39. The process as set forth in claim 34 wherein the hot circulating absorption liquor is removed substantially from the bottom of the gas/liquid contact zone.

40. The process as set forth in claim 34 wherein the contaminant gas is selected from the group consisting of $SO_2$, $CO_2$, $NO_x$, $H_2S$, HCl and ammonia.

41. The process as set forth in claim 40 wherein the contaminant gas comprises an acid gas.

42. The process as set forth in claim 40 wherein the contaminant gas comprises sulfur dioxide.

43. The process as set forth in claim 34 wherein the contaminant gas content of the feed gas stream is at least about 4 vol.%.

44. The process as set forth in claim 34 wherein the sorbent comprises sodium malate and the cooled circulating absorption liquor is returned to the gas/liquid contact zone at a temperature not greater than about 45° C.

45. The process as set forth in claim 34 wherein the hot circulating absorption liquor is removed from the gas/liquid contact zone at a temperature not greater than about 50° C.

46. The process as set forth in claim 34 wherein the hot circulating absorption liquor is removed from the gas/liquid contact zone at a temperature from about 25° to about 35° C.

47. The process as set forth in claim 34 further comprising:
contacting the contaminant-enriched absorption liquor with stripping steam in an absorption liquor stripper to desorb the contaminant from the contaminant-enriched absorption liquor and thereby produce a regenerated contaminant absorption medium and a primary stripper gas effluent comprising water vapor and contaminant gas.

48. The process as set forth in claim 47 wherein a forward flow fraction of contaminant-enriched absorption liquor is withdrawn from the contaminant gas absorber upstream of the external heat exchanger and the forward flow fraction is introduced to the absorption liquor stripper.

* * * * *